United States Patent
Jirele et al.

(10) Patent No.: US 8,070,857 B2
(45) Date of Patent: Dec. 6, 2011

(54) PARTICULATE REMOVAL TOOL

(75) Inventors: Jim Jirele, Owatonna, MN (US); Stan Norland, Claremont, MN (US); William Clayton Brown, Owatonna, MN (US); Jamie Erin Stringfield, Peoria, IL (US); David Painter, Wyoming, IL (US); Mark Gasper, Delavan, IL (US); Eric Vinyard, Peoria, IL (US); James Sarnes, East Peoria, IL (US); Jade Katinas, Chillicothe, IL (US); Jason Scott Cooper, Lacon, IL (US); Cheryl Lynn Sellers, Peoria, IL (US); James Josh Driscoll, Dunlap, IL (US)

(73) Assignee: SPX Corporation, Charlotte, NC (US)

( * ) Notice: Subject to any disclaimer, the term of this patent is extended or adjusted under 35 U.S.C. 154(b) by 947 days.

(21) Appl. No.: 12/024,215

(22) Filed: Feb. 1, 2008

(65) Prior Publication Data
US 2008/0184679 A1 Aug. 7, 2008

Related U.S. Application Data

(60) Provisional application No. 60/899,005, filed on Feb. 2, 2007.

(51) Int. Cl.
*B01D 46/00* (2006.01)

(52) U.S. Cl. ............... 95/280; 55/283; 55/294; 55/297; 55/302

(58) Field of Classification Search ............... 55/283, 55/294, 287, 291, 297–298, 300–304; 96/397, 96/428; 95/279, 280
See application file for complete search history.

(56) References Cited

U.S. PATENT DOCUMENTS

| | | | | |
|---|---|---|---|---|
| 4,035,170 A | * | 7/1977 | Lear et al. | 55/282.2 |
| 4,693,815 A | * | 9/1987 | Collins, Jr. | 210/107 |
| 4,948,504 A | * | 8/1990 | Kierdorf et al. | 210/238 |
| 5,427,596 A | * | 6/1995 | Jorgenson et al. | 96/399 |
| 2006/0207920 A1 | * | 9/2006 | Lackey et al. | 210/87 |

* cited by examiner

*Primary Examiner* — Duane Smith
*Assistant Examiner* — Karla Hawkins
(74) *Attorney, Agent, or Firm* — Baker & Hostetler LLP

(57) ABSTRACT

A particulate removal tool and method are provided to remove the particulates such as ash and soot from a particulate filter. The particulate filter can be placed on a filter holder in a housing of the tool where a quick burst of air can be provided to clean the particulate filter. The air then can travel to a container which includes additional filter to filter the air. A vacuum can be used to remove additional particulates from the container.

15 Claims, 25 Drawing Sheets

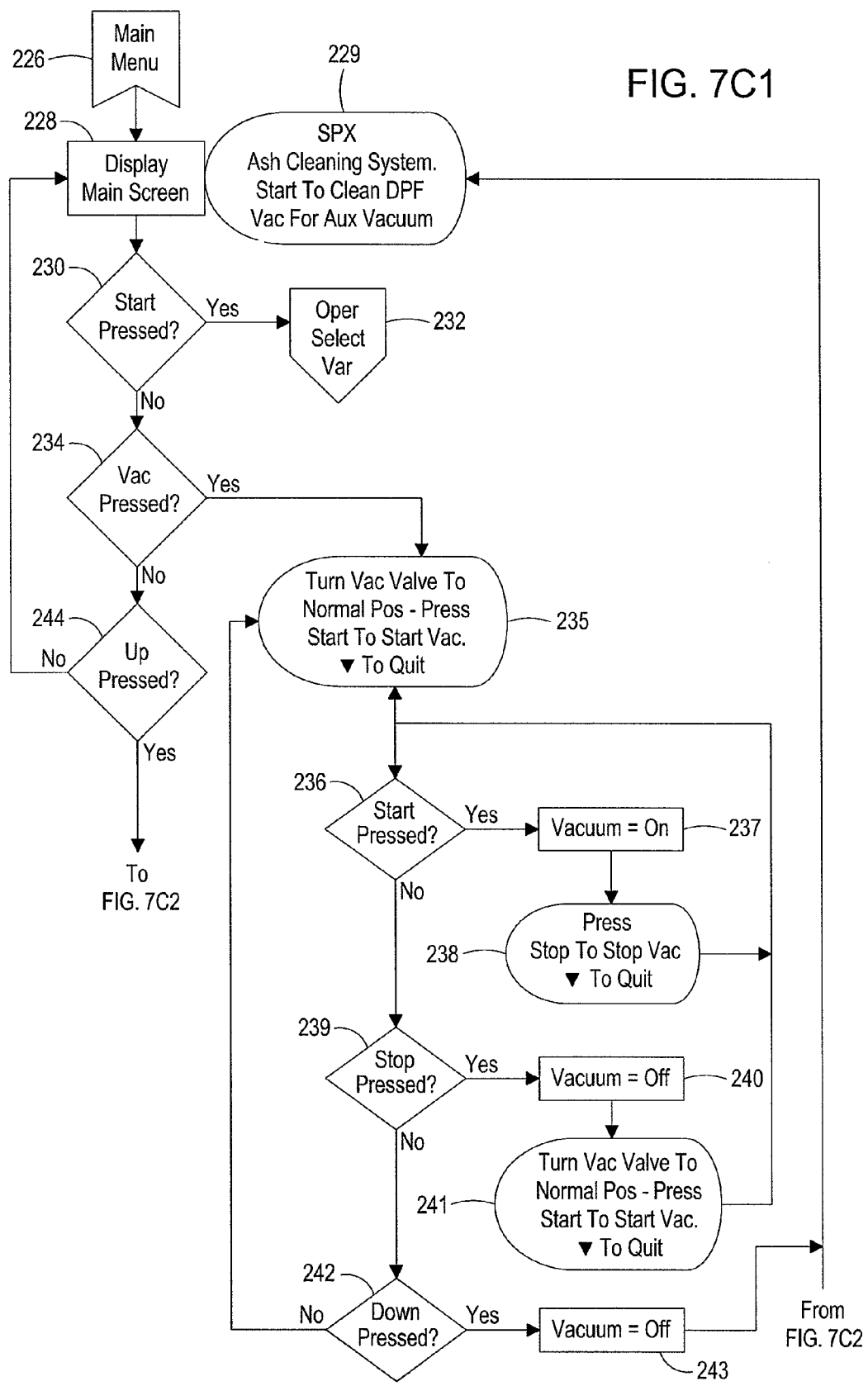
FIG. 7C1

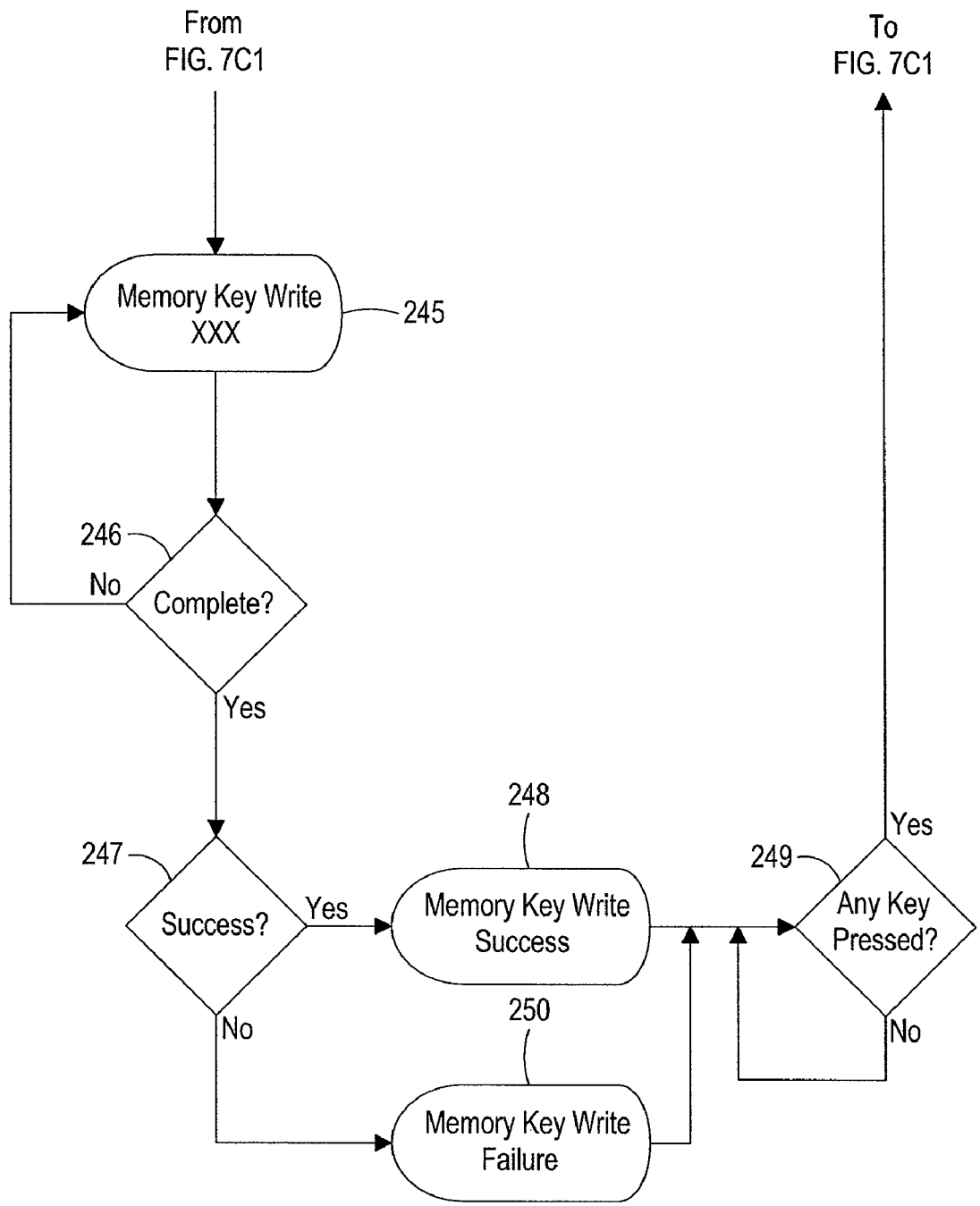
FIG. 7C2

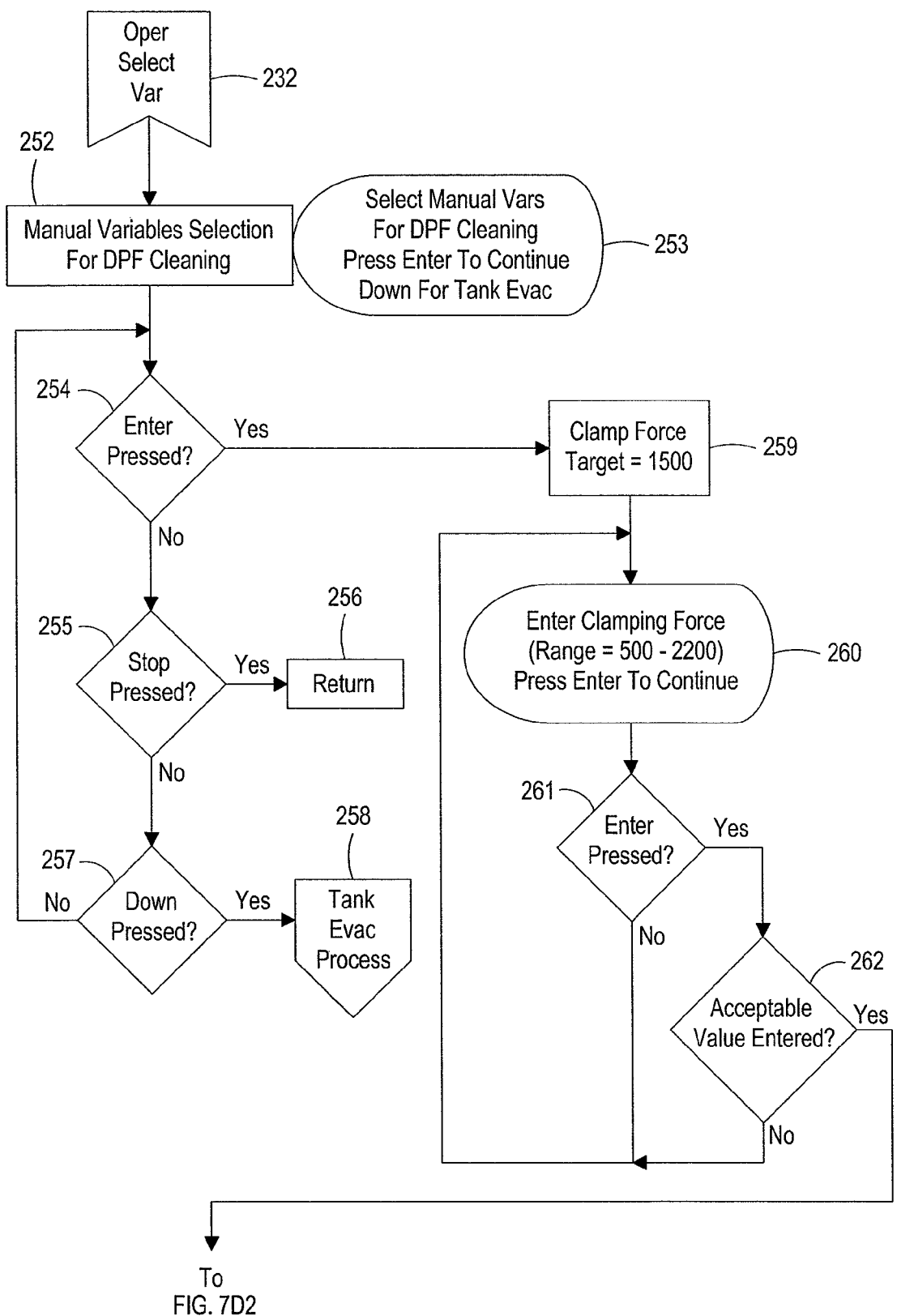
FIG. 7D1

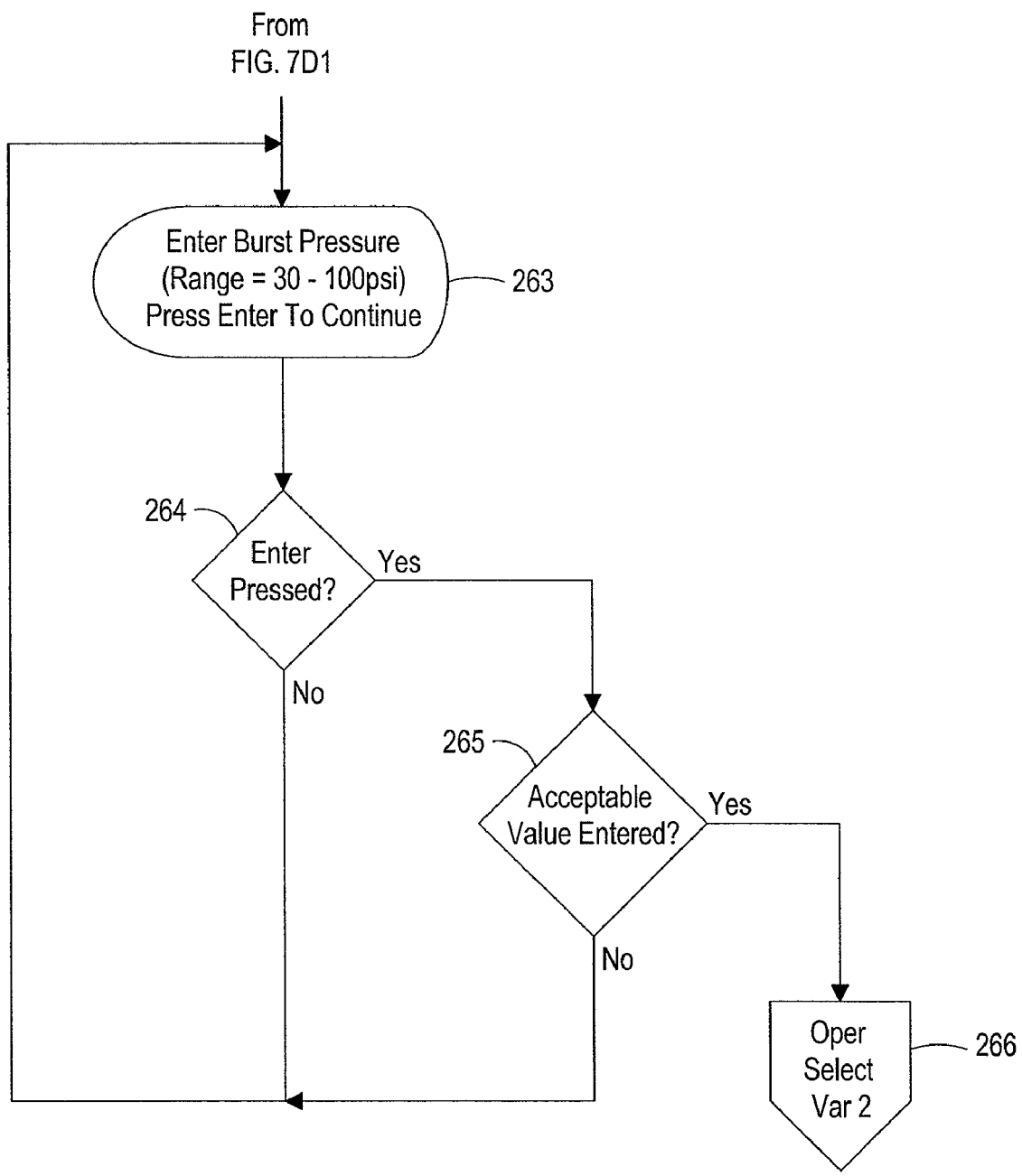
FIG. 7D2

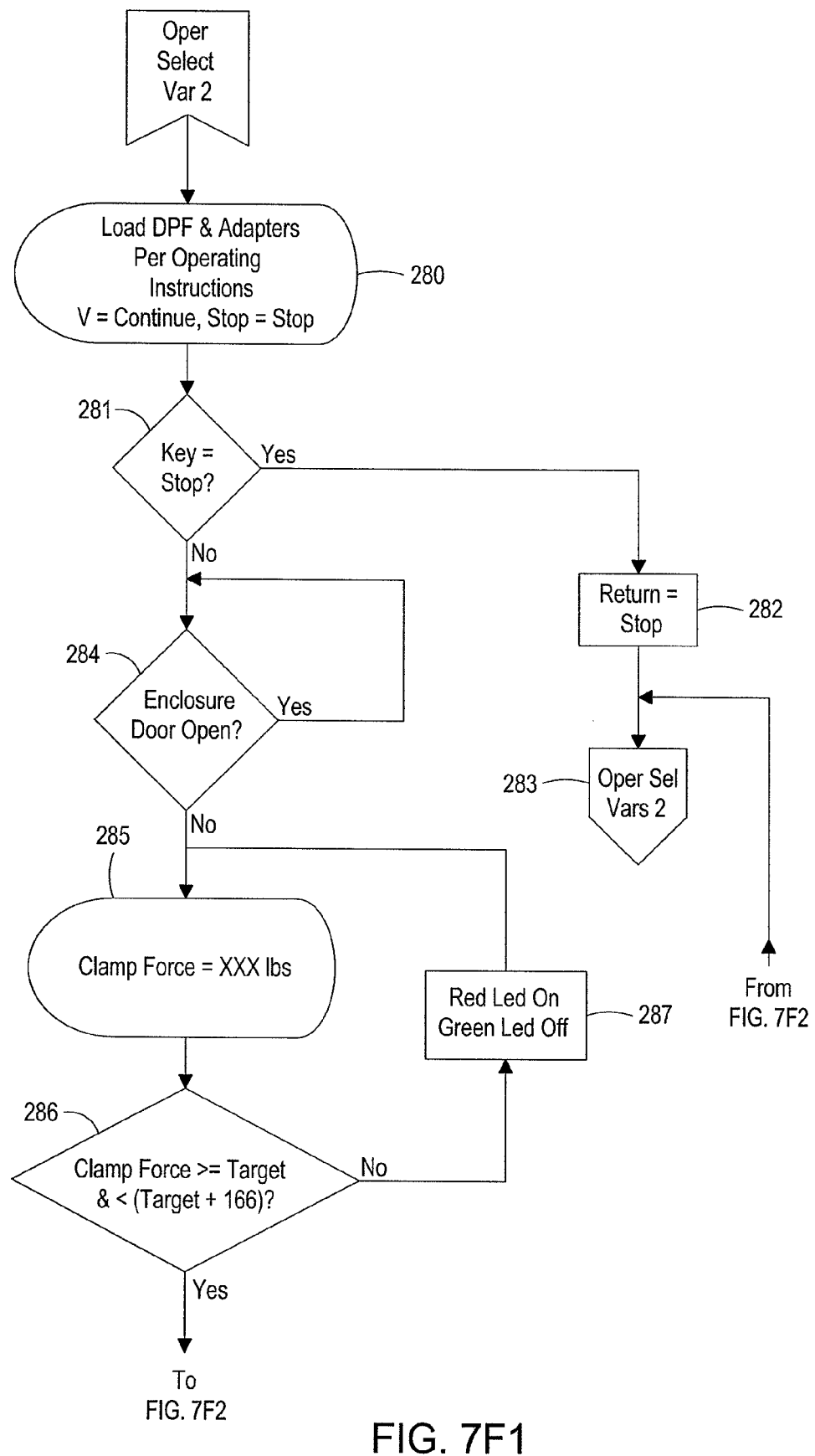
FIG. 7F1

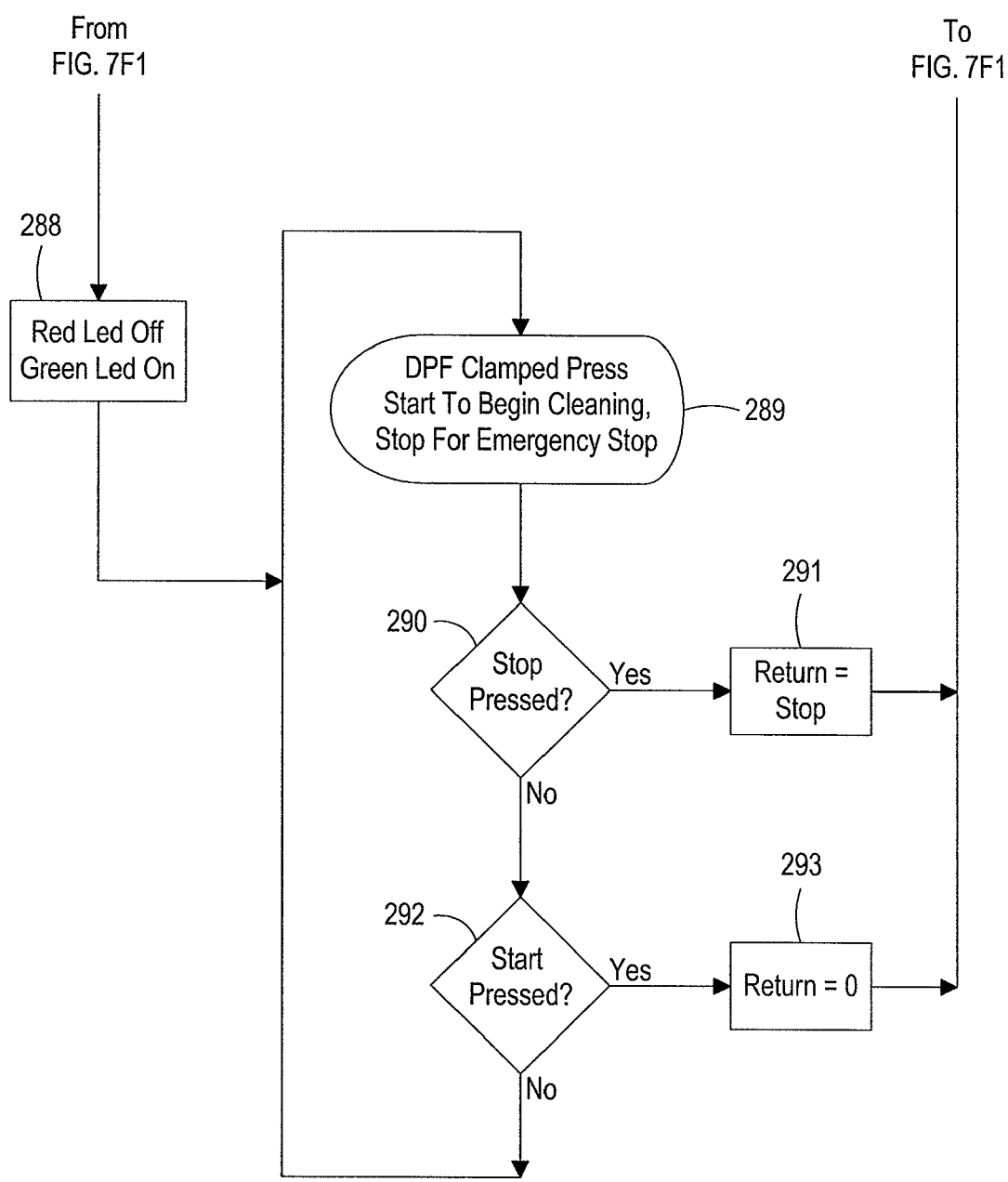
FIG. 7F2

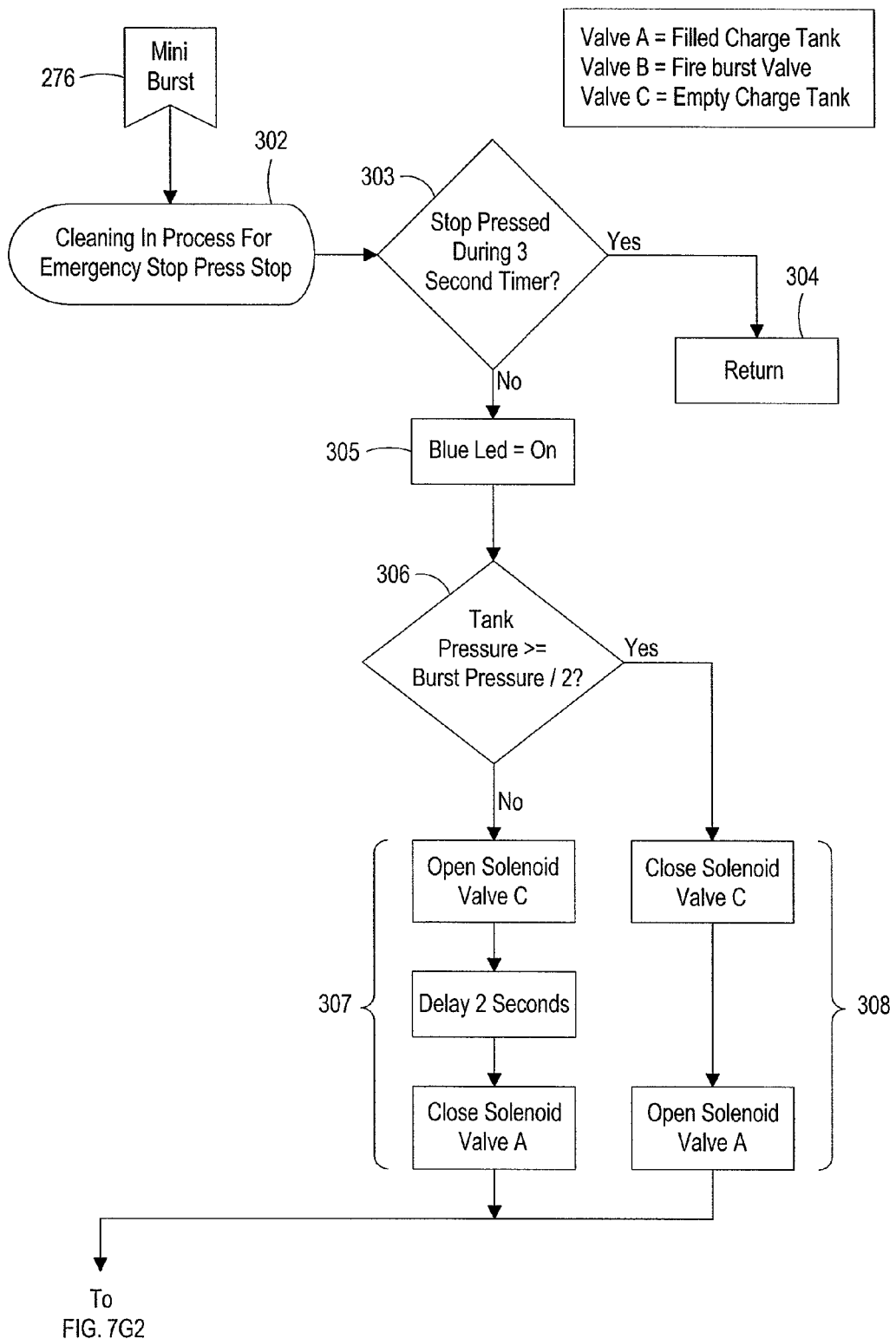
FIG. 7G1

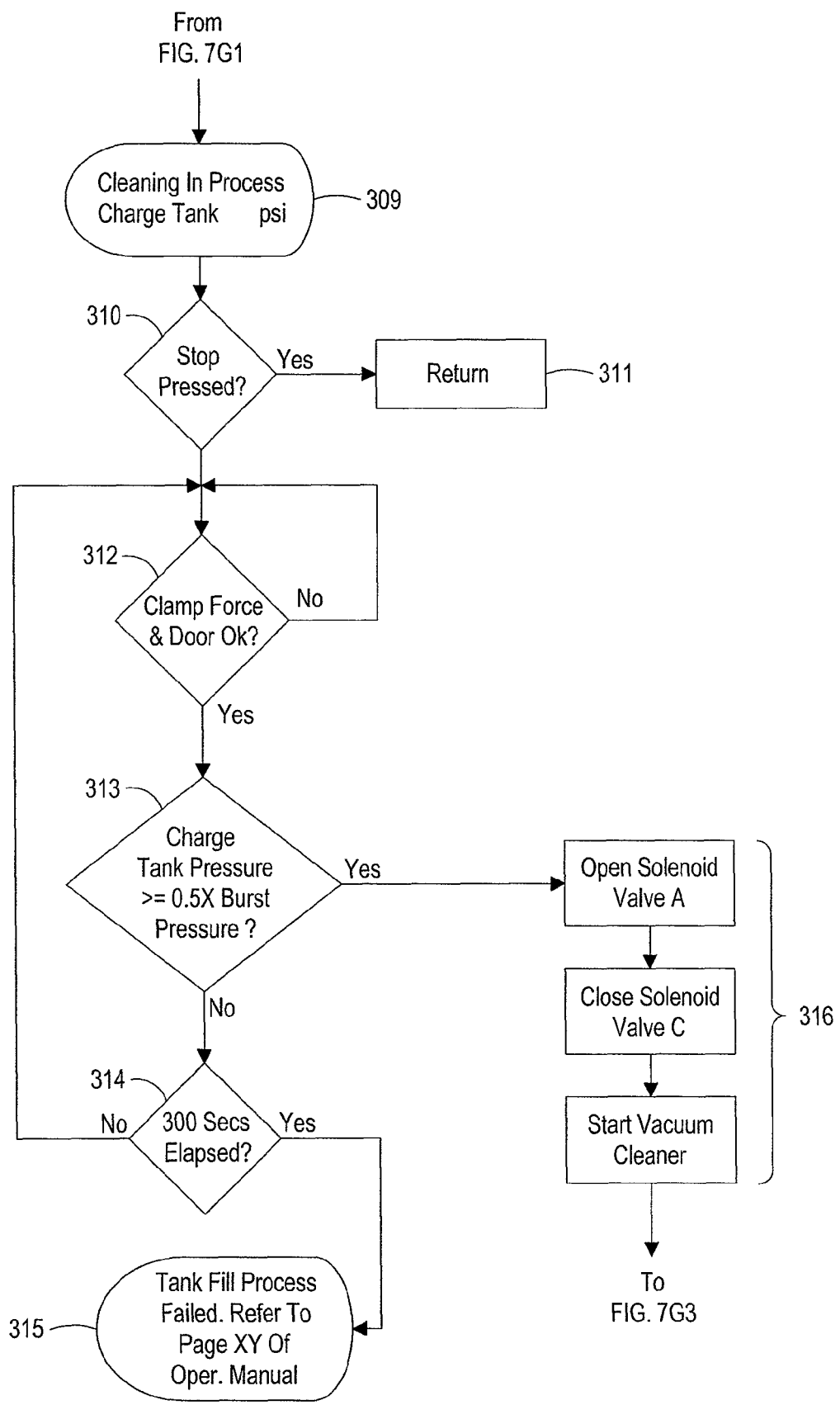
FIG. 7G2

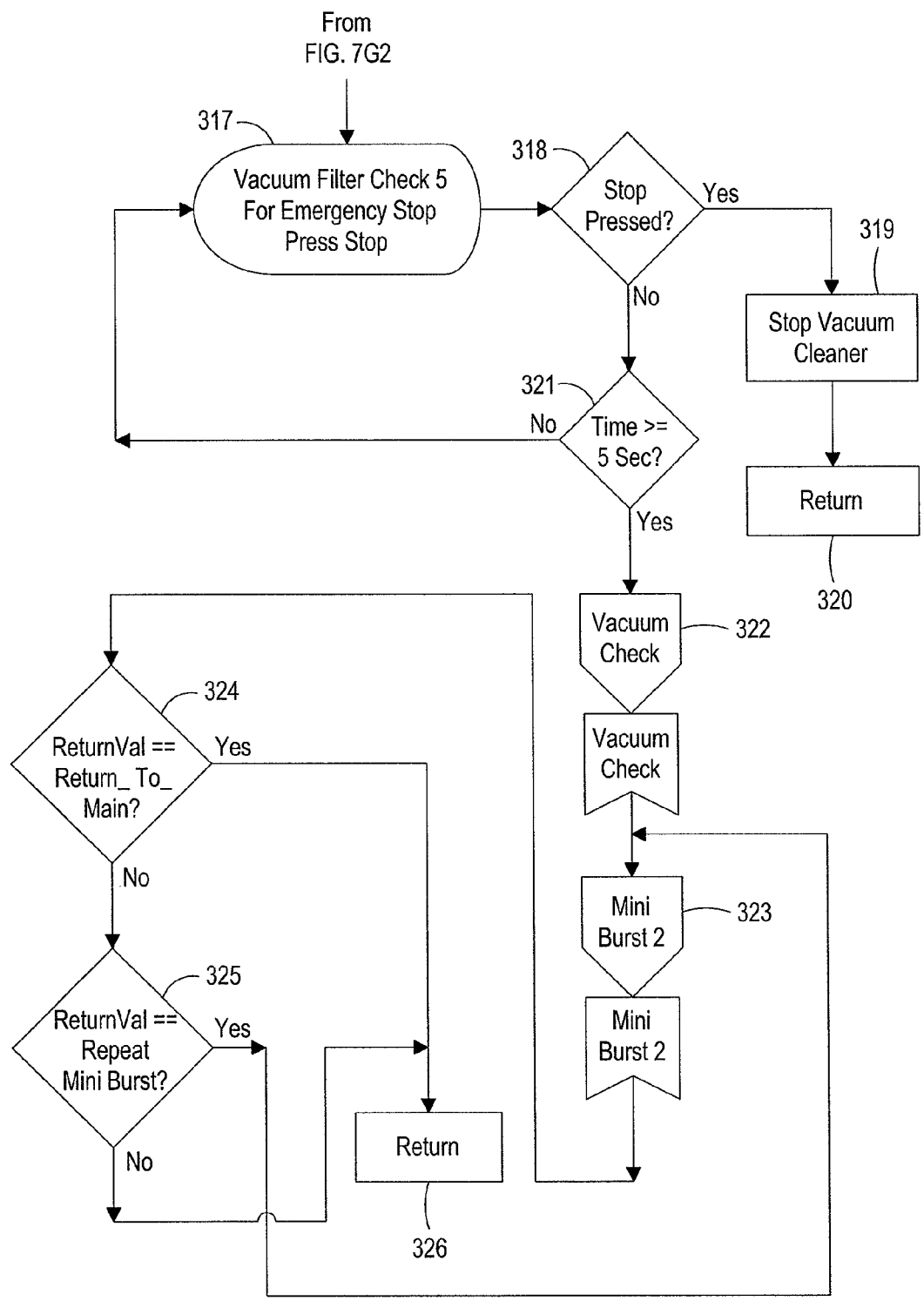
FIG. 7G3

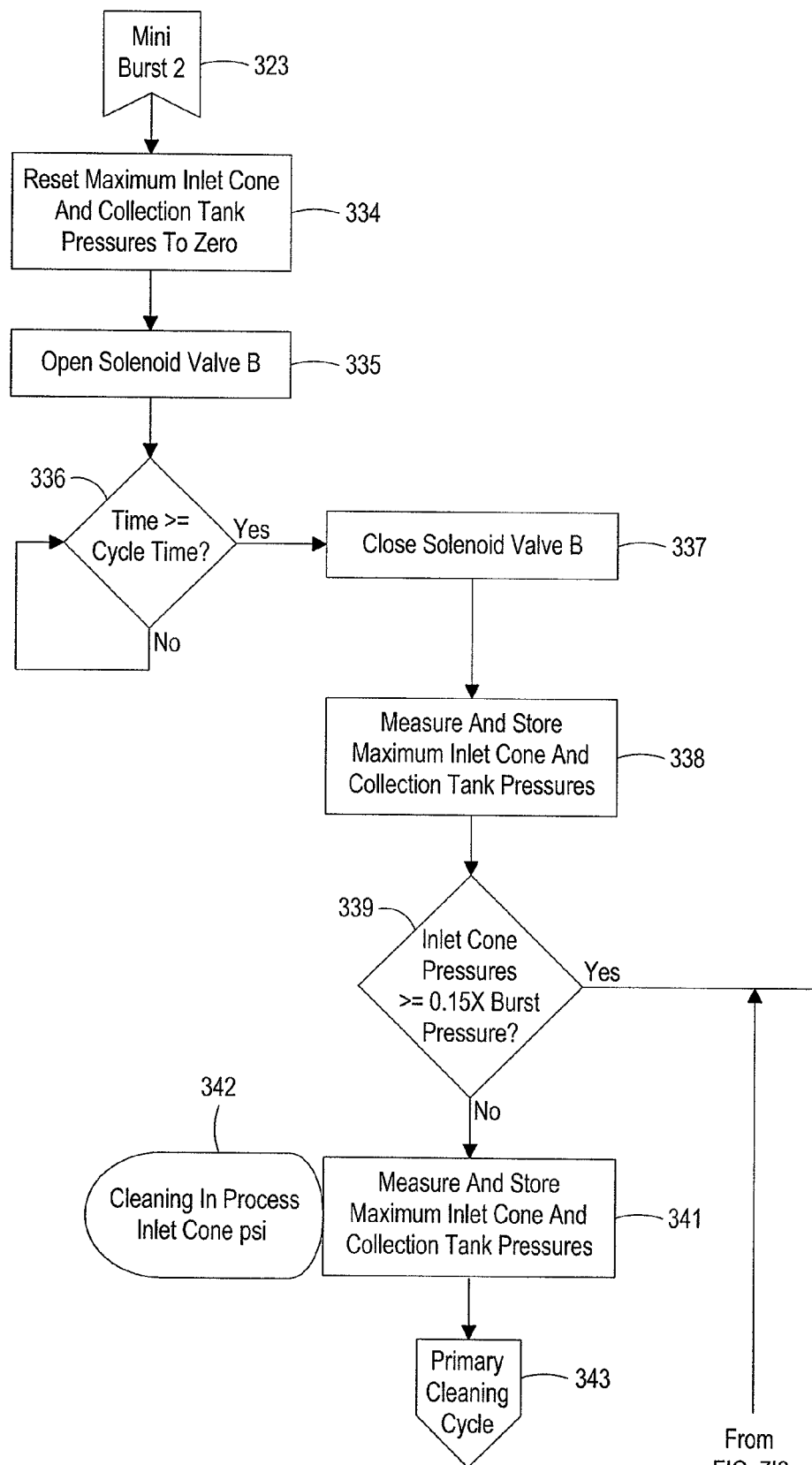
FIG. 7I1

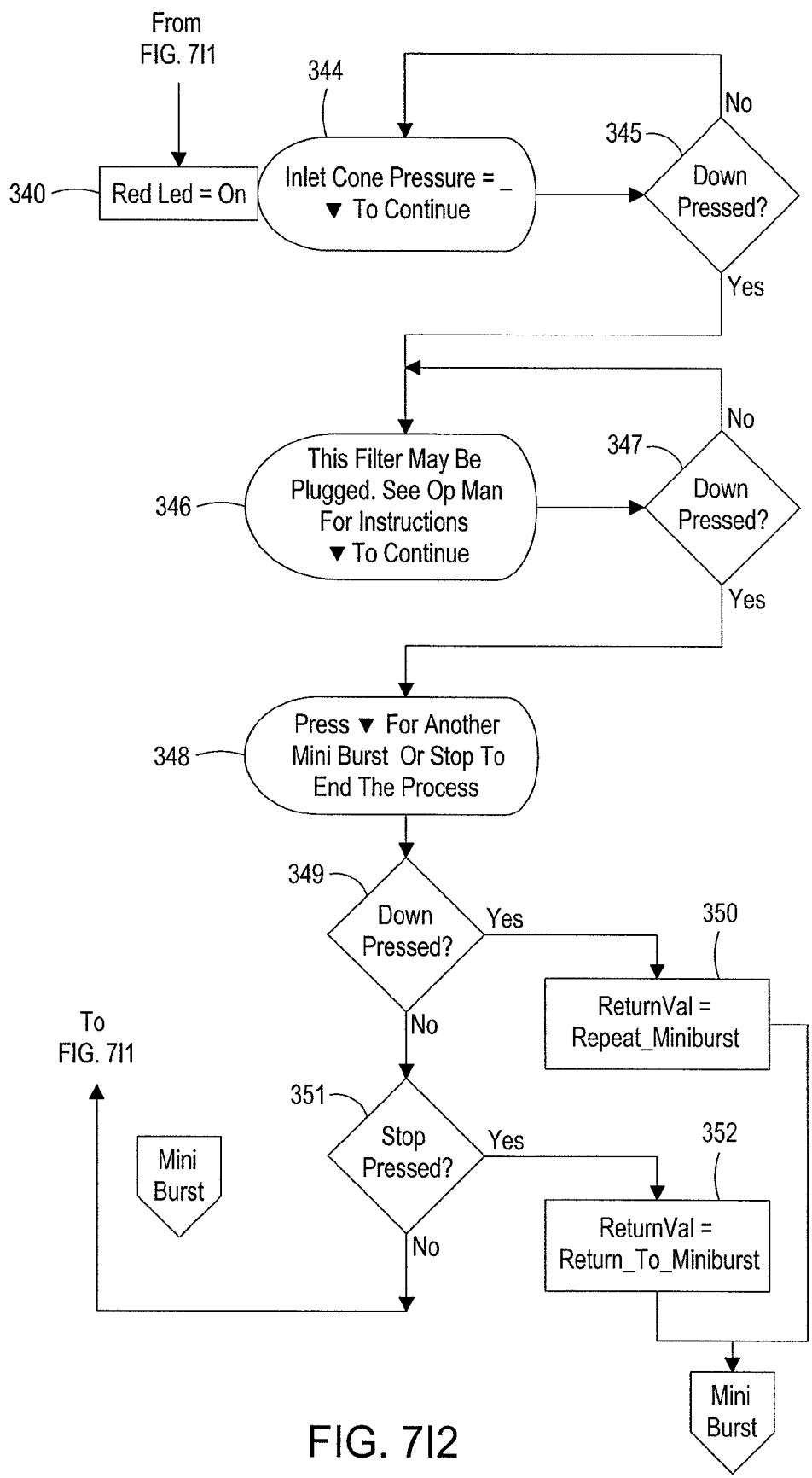
FIG. 7I2

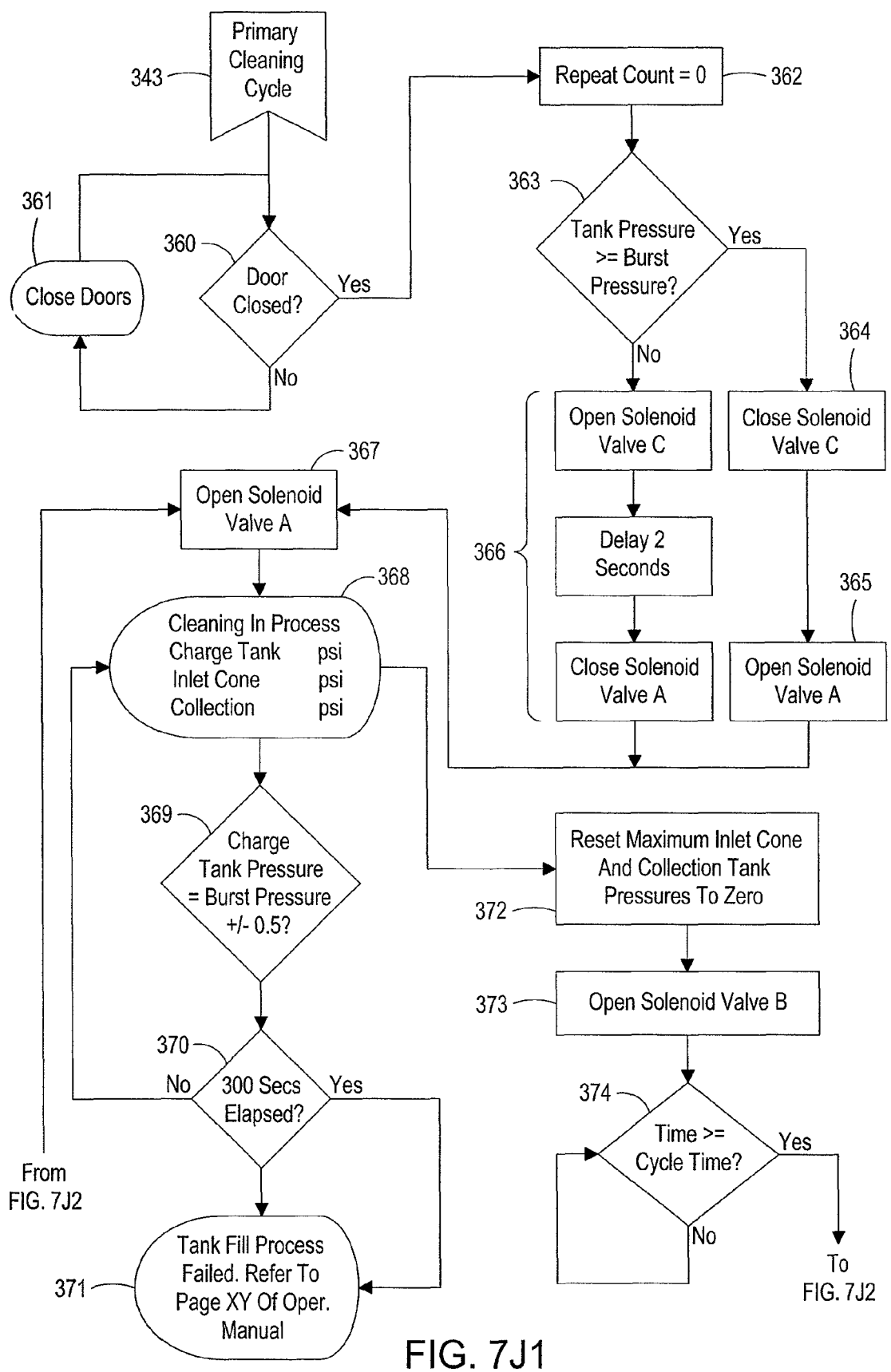
FIG. 7J1

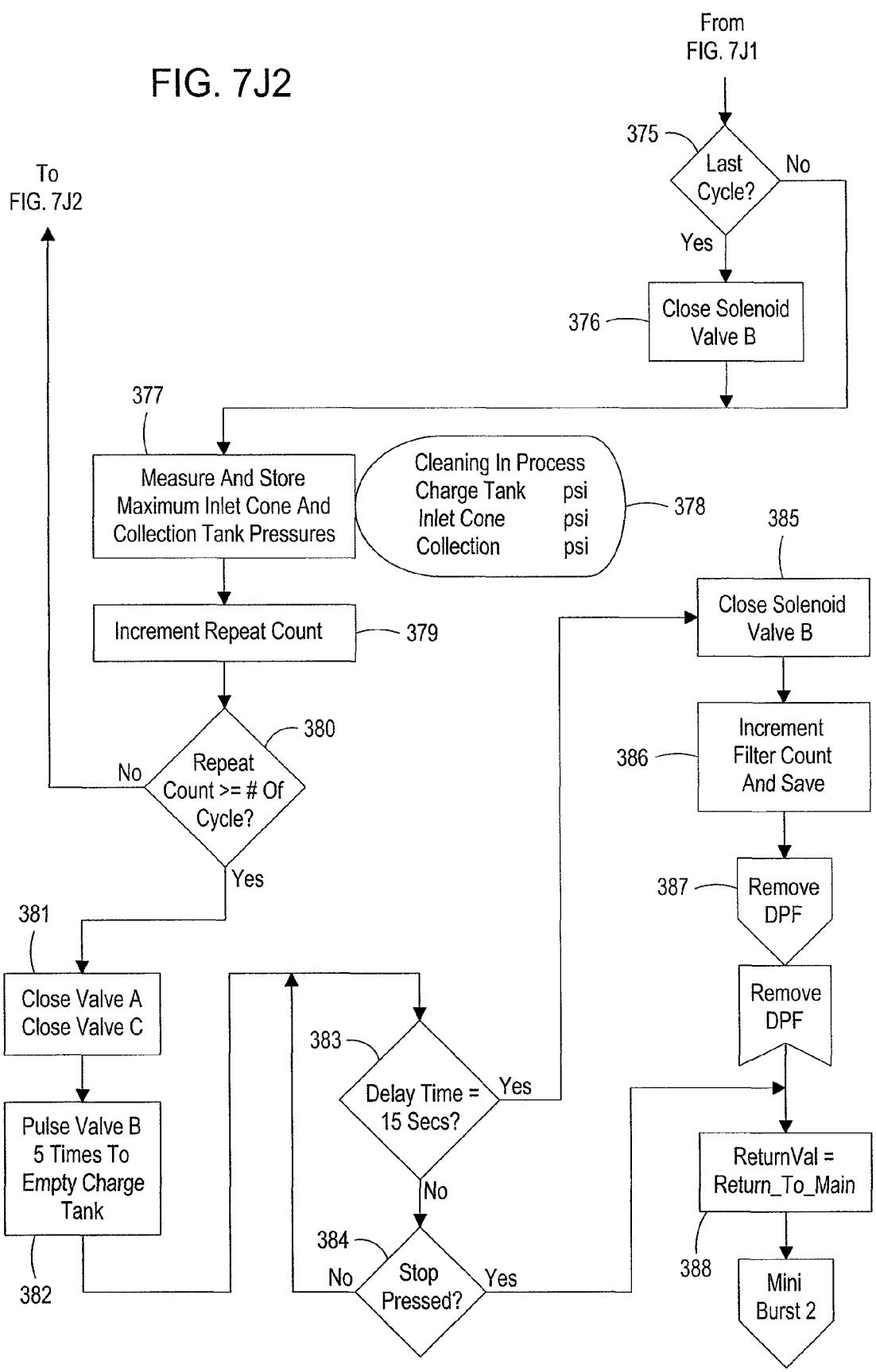
FIG. 7J2

PARTICULATE REMOVAL TOOL

CROSS-REFERENCE TO RELATED APPLICATIONS

This application claims priority to U.S. patent application entitled, "PARTICULATE REMOVAL TOOL," filed Feb. 2, 2007, having a Ser. No. 60/899,005, the disclosure of which is hereby incorporated by reference in its entirety.

FIELD OF THE INVENTION

The present invention relates generally to an apparatus and method to remove contaminants. More particularly, the present invention relates to an apparatus and method to remove particulate and contaminants, such as ash and soot from diesel particulate filters.

BACKGROUND OF THE INVENTION

Diesel engines, gasoline engines and other engines emit contaminants and other pollutants as part of their operating products. Emissions from vehicles and other sources that use these engines are becoming more of a concern for the environment as the world economy is expanding and the potential for global warming is increasing. The emissions standards set by governing bodies have become stricter and the amount of contaminants that can be released from a vehicle has dramatically decreased.

Conventional methods and devices that trap the contaminants include using a filter to trap and reduce the amount of contaminants that are dispersed into the environment through the exhaust portion of a vehicle. However, after use over many hours, the contaminants build up in the filters and impede the air flow of the exhaust. The impeded air flow will increase the cost of operating the engine and decrease the efficiency of the filters. Thus, the filters need periodic maintenance and cleansing.

Accordingly, it is desirable to provide a device and method that can clean the filter with a burst of air and contain the dispersed contaminants within a system for disposal.

SUMMARY OF THE INVENTION

The foregoing needs are met, to a great extent, by the present invention, wherein one aspect of an apparatus is provided that in some embodiments provide a particulate removal system that can remove particulates that have been trapped in a filter.

In accordance with one embodiment of the invention, a particulate removal tool that cleans a diesel particulate filter can include a control panel having a controller to control the particulate removal tool functions, wherein the control panel includes an input device, an air tank can supply air for a burst of air to clean the diesel particulate filter to be cleaned, a filter cone adapted to mate with the diesel particulate filter to be cleaned and to receive the air from the air tank, a quick acting valve controlled by the controller and configured to provide the burst of air to clean the diesel particulate filter to be cleaned, wherein the air used by the quick acting valve is supplied by the air tank, a filter holder configured to hold the diesel particulate filter to be cleaned in place on a movable table, a hydraulic pump to move the movable table, a collection container having a first filter to filter a particulate filled air resulting from the cleaning of the diesel particulate filter to be cleaned, and a vacuum to remove particulate from the tool, wherein a filter housing is configured to house the diesel particulate filter to be cleaned, the filter cone, the filter holder, and the movable table.

In another embodiment of the invention, a method of cleaning a diesel particulate filter includes providing air to an air tank from an external air source, wherein the air tank provides air for a burst of air, placing a diesel particulate filter on a filter holder housed in a filter housing of a particulate removal tool, moving the diesel particulate filter in position underneath a filter cone in the filter housing with a movable table, wherein the movable table is moved with a pump, creating a clamping pressure between the diesel particulate filter and the filter cone based partly on the position of the movable table, providing the burst of air from a quick acting valve to clean the diesel particulate filter, wherein particulates trapped in the diesel particulate filter are displaced into a surrounding air, and moving the surrounding air with the displaced particulates to a collection container.

In still another embodiment of the invention, a particulate removal tool that cleans a diesel particulate filter includes a means for controlling having a means for processing configured to control the particulate removal tool functions, wherein the means for controlling includes a means for inputting, a means for supplying air configured to supply air for a burst of air to clean the diesel particulate filter to be cleaned, a means for adapting configured to adapt to mate with the diesel particulate filter to be cleaned and to receive the air from the means for supplying air, a means for pulsating air controlled by the means for processing and configured to provide the burst of air to clean the diesel particulate filter, a means for holding configured to hold the diesel particulate filter to be cleaned in place on a means for supporting, a means for moving configured to move the means for supporting, wherein a clamping pressure is created between the means for adapting and the filter in part by the means for supporting, a means for collecting having a first filter to filter particulate filled air resulting from the cleaning of the diesel particulate filter to be cleaned, and a means for vacuuming configured to remove particulate from the tool, wherein a means for housing is configured to house the diesel particulate filter to be cleaned, the means for adapting, the means for holding, and the means for supporting.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIGS. 7A through 7M illustrate a method to operate the system 100 according to an embodiment of the present invention.

DETAILED DESCRIPTION

Figure 1:
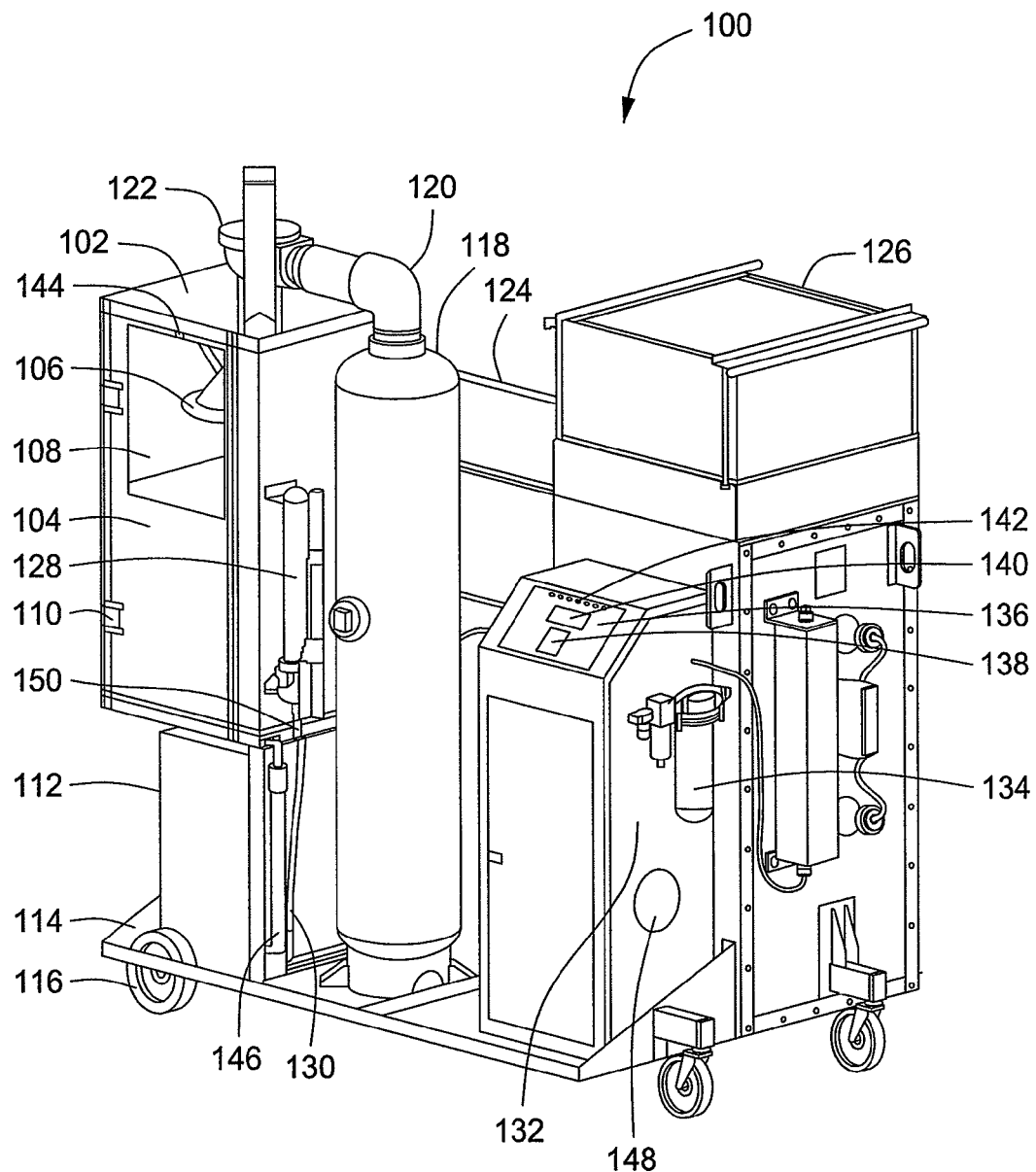
FIG. 1 illustrates an exemplary embodiment of a particulate removal system of the present invention.

The invention will now be described with reference to the drawing figures, in which like reference numerals refer to like parts throughout. An embodiment in accordance with the present invention provides an apparatus and method to clean a filter, such as a diesel particulate filter (DPF) used in a diesel engine. The particulate removal system is not limited to removing particulates, but can remove any matter trapped by the filter, such as ash, soot, sulfur compounds, and other matter. The invention is not limited to cleaning only filters used in diesel engines or other engines, but could be used to clean any filter used in any machine.

Figure 6:
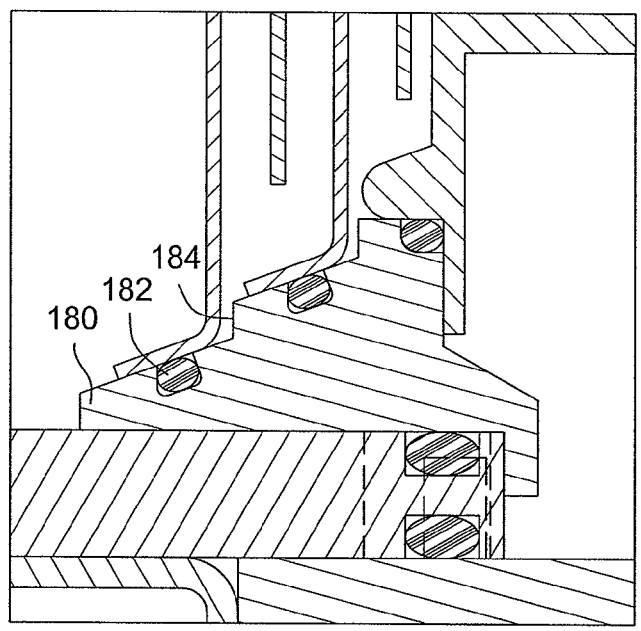
FIG. 6 illustrates the filter holder of the present invention.

FIG. 1 illustrates an exemplary embodiment of a particulate removal system 100 of the present invention. The system 100 includes a filter housing 102 that houses a DPF 152 (FIG. 3) to be cleaned, a filter cone 106 and a filter holder 180 (FIG. 6). The filter cone 106 and the filter holder 180 are adapted to be mate with various sizes of filters. For example, a filter ranging from outer diameters of 200 mm to 400 mm and various other sizes (9 inches to 15 inches). A person skilled in the art will recognize the system 100 can be adapted for any filter and filter size. The filter cone and holder will be further discussed below.

The filter housing 102 includes at least one housing door 104 having a window 108. In one embodiment, the filter housing 102 includes two filter housing doors that are latched together by a latch 110. The window 108 allows the user to view the operation of the filter cleaning and any problems that may be occurring within the housing 102. The housing door 104 includes a door sensor 144 that senses when the doors are in an open state during the operation of the system 100. Should the housing doors 104 be opened during operation, the system 100 will be paused or ceases to operate until the doors 104 are closed. The system 100 can then start up again automatically or the user can press a button on a control panel 136 (further discussed below) to restart the system. The system can restart from the beginning of the cleaning operation, can restart at the point where it was paused or at any other predetermined portion of the operation.

The filter housing 102 includes a table 162 (FIG. 3) that supports the filter 152 and the filter holder 180. The table 162 is moveable by a fluid source, such as a hydraulic hand pump 128, and by lift cylinders 146. The user can pump fluid which travels through hydraulic line 130 into lift cylinders 146 to move the table. The table can be moved by other mechanisms such as by liquid, air, electrical actuators, and by mechanical means, such as a hand crank. In other embodiments, a controller (discussed below) and controller program can be used to move the table 162 to the correct position depending on the DPF being cleaned and the information entered regarding the particular DPF. A bellow 164 (FIG. 3) is provided between the table 162 and a collection tank 112 so that particulates do not escape into the environment when the table is moved or when the system is in operation. In operation, the table allows the filter to have the desired clamping pressure between the filter cone and the filter. A good clamping pressure allows for maximum utilization of the air burst during the cleaning operation so that air does not or minimally escape between the filter cone 106 and filter 152. Otherwise, the efficiency of the system is decreased if air from the air burst escape into the environment.

The filter housing 102 mates with a collection tank 112. The collection tank 112 includes additional filters (not shown) housed in portion 124 to collect the particulates dispersed from the cleaning for later disposal. A HEPA filter 126 can be optionally coupled with the collection tank 112 so that any remaining particulates can be filtered before the remaining air of the air burst is released into the environment. Other filters can also be used so long as it can trap the remaining particulates before the air is released into the environment. The collection tank 112 is supported by a base 114. The base is constructed and arranged to support the various components of the system 100 including the user. The system 100 is made to be movable on wheels 116 that are attached to the base 114.

Figure 3:
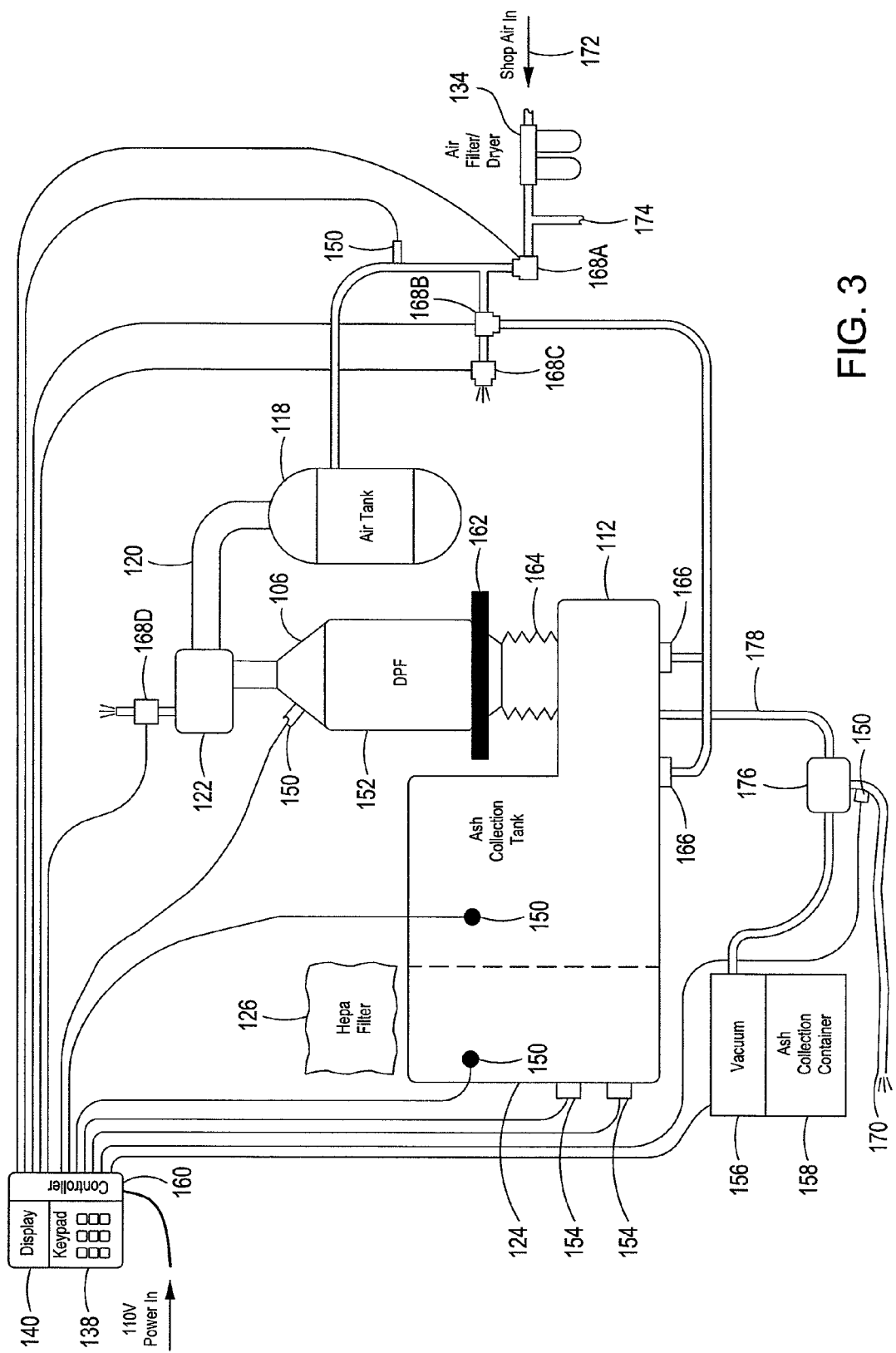
FIG. 3 is a block diagram of the system of the present invention.

An air tank 118 is coupled to the filter housing 102 to provide the burst of air to clean the DPF. The air tank receives air from an external source that is controlled by the control panel 136 and filtered by an air filter 134 (FIG. 3). The air in the air tank is built up to the pressure level of the desired burst in order to clean the desired filter. The air can be delivered to the filter cone via an air conduit 120 and through a diaphragm valve 122. The diaphragm valve 122 (2-way) is a quick acting valve that is constructed and designed to provide a quick burst of air. The valve 122 can provide air at the desired pressure to the filter cone in order to clean the filter.

The control panel 136 includes an input device 138, a display 140 and LEDs 142. The input device 138 allows the user to enter information and/or instructions into the system 100. The input device 138 can be a key pad that is numeric, alphanumeric, and can include directional arrows, function keys or a combination thereof. A user can manually input information regarding the DPF or the engine that uses the DPF. The input device 138 can also include a bar code scanner, RFID reader or other readers that will allow the system 100 to receive information regarding the DPF and include information such as a filter's make, model, manufacturer, maintenance record and other information. An optional bar code encoder, RFID encoder and other encoders may also be part of the system 100 in order to encode information desired by the user such as how many times the DPF has been cleaned or serviced or the dates of service. The input device allows the user to operate the system 100 including inputting the pressure of the desired burst. The desired burst will depend on the filter being cleaned and can be between about 50-150 psi. However, bursts at lower or higher p.s.i. are also contemplated by the invention. The user can also input the number of bursts and the duration of the bursts. The operating parameters can also be set automatically by a controller 160 (FIG. 3) in the control panel based on the type of filter or which engine or vehicle the filter was operated in. The information regarding the filter can be stored in a memory of the controller or in a separate memory from the controller and accessed by the controller.

The display 140 can be an LCD, VGA, or any other displays desired by the user. The display can also be touch screen and can also act as an input device. The display can display the number of burst the system will conduct, the number of bursts that has been completed, the duration of bursts, the clamping pressure and other information desired by the user. The controller 160 can control the information displayed on the display including various messages to the user.

The LEDs 142 can provide the user with operating conditions or the status of system in its operation. The LED can be one or more different colors and can be on one at a time or a combination of LED to indicate the operating conditions of system 100. The LEDs can indicate when the door is opened, when the air is being filled in the air tank, when the cleaning process is in progress, when there is a problem in the system and other indications as desired.

A control housing 132 houses the control panel 136 and a hose line from the outside air source. The control housing can also store a vacuum (discussed below) having a container. The control housing 132 also includes a fan 148 that can be controlled by a controller 160 (FIG. 3) in the control panel to cool the vacuum during the vacuum's operation or when it is turned off.

Figure 2:
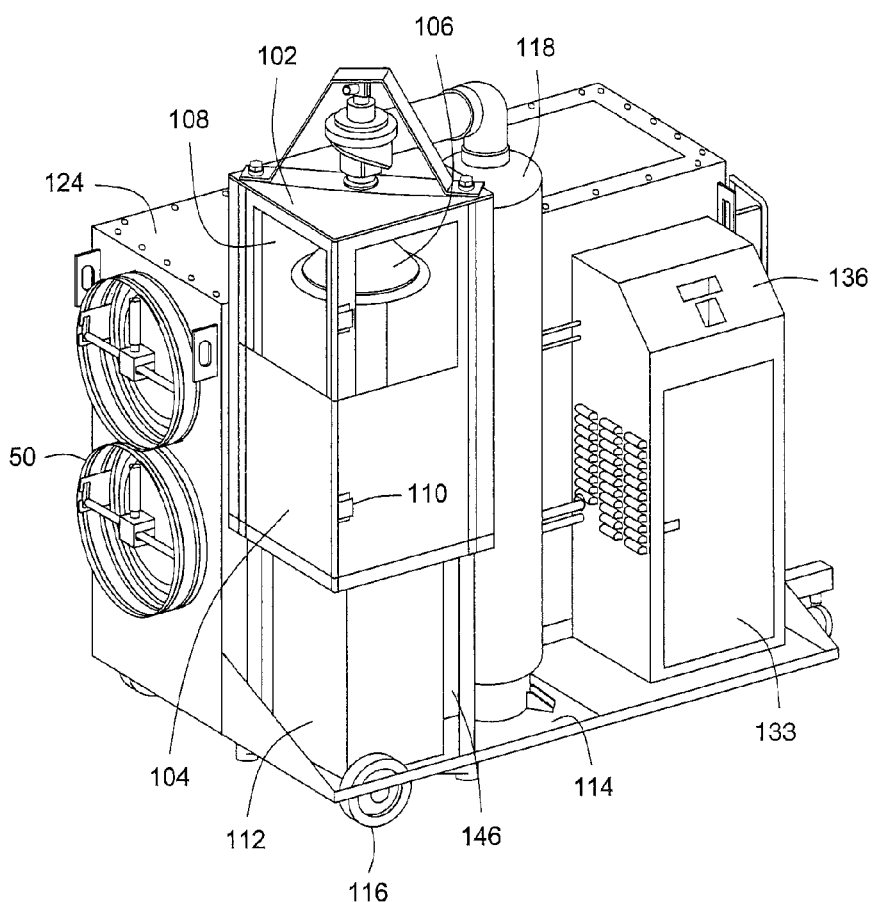
FIG. 2 is a perspective view of system of the present invention.

FIG. 2 is a perspective view of system 100 according to an embodiment of the invention. In this view, a filter door 50 is provided for access to the filters (that trapped particulates dispersed during cleaning) therein. In one embodiment, there is one filter that is filtering the air containing particulates that were dislodged from the DPF during cleaning. FIG. 2 illustrates another embodiment wherein there are two filters that filter the air containing particulates dispersed during cleaning. In other embodiments, three or more filters are contemplated. The filter can be generally tubular and having an inner passage, but other shapes are also within the embodiments of the invention. The filters can filter the air containing particulates that flows from the outside to the inside or the inner passage of the DPF. In other embodiments, the air containing the contaminants can flow from inner passage of the filter to the outside of the filter. Also shown in FIG. 2 is a storage compartment door 133. The storage compartment can be used for various things such as storage for a vacuum cleaner or any other devices.

FIG. 3 is a block diagram of the system 100 according to an embodiment of the present invention. Air in 172 is provided by an external air source, such as a compressor. However, other sources of air such as another air tank or other air sources can be used. The filter 134 is provided in the air in line in order to filter any contaminants or dry any moisture that may be in the air in 172. The air line also feeds a reverse pulse line 174 that can connect to reverse flow valves 154 (TOP and BOTTOM) that are controlled by the controller 160. The air line includes solenoid valves 168a, 168b, and 168c that can direct the air in 172 throughout the system 100. Solenoid 168b can provide air in 172 into the fluidizer 166 that can make the particulate matters in the collection tank 124 to be more fluid like for easier removal. The air in 172 can proceed to the air tank 118 (via solenoid 168a), where air pressure can build up therein. A pressure transducer 150 is provided to detect the amount of air in the air tank 118 and the pressure transducer communicates with the controller 160 located in or near the control panel. The amount of pressure that builds up in the air tank can be controlled by the controller.

Air in 172 can then travel to air conduit 120 and await the opening of the diaphragm valve 122 so that a quick burst can be achieved to clean the DPF. The quick acting diaphragm valve 122 can remain close due to the air provided by solenoid valve 168d and open when valve 168d vents air into the environment. The air from the diaphragm valve 122 can be transmitted to the filter cone 106 where the cone can provide a burst of air to DPF 152. Other quick acting valves with an opening or aperture can be used so long as the valve can release a large amount of pressurized air burst in a short amount of time into the DPF.

The burst of air can include an optional mini-burst. The mini burst can test to see if air will pass through the DPF 152 in case the DPF is clogged. Sending a large burst may damage the DPF or the system's component such as the filter housing should the DPF is clogged. However, the mini burst may or may not be performed before the quick burst. The amount of pressure provided by the mini burst can be controlled by the controller 160 and is typically less than a quick burst. In other embodiments, more than one mini-burst are used.

A pressure transducer 150 located in the cone 106 and another transducer located in the housing (not shown) can determine if the burst of air is working on the filter. The pressure difference between these two transducers can assist in determining whether the filter can be cleaned or is being cleaned by the burst of air.

As previously stated the clamping pressure is created between the filter cone and the DPF because the DPF is supported by the moveable table 162. The clamping pressures can range from about 500 to 2000 p.s.i., however, other clamping pressure of less than about 50 p.s.i. and greater than about 2000 p.s.i. are also within the embodiments of the invention. The table can be raised by the pump so that the DPF can form a seal with the filter cone 106. A pressure transducer 150 is placed at the outlet of the pump FIG. 1), along the hose from the pump to the table or at the connection point between the hose and the table in order to monitor the clamping pressure. The pressure transducer sends signals to the controller so that the controller can determine if the clamping pressure for a particular filter has been reached. The table 162 is coupled with bellows 164 so that the particulates dispersed during cleaning remain trapped within the system and move to the collection tank 112. The bellows is flexible so that it can move with the table. The table can be moved up and down and can accommodate filters of all sizes.

After a mini burst (if performed), the DPF can be cleaned with a quick larger burst at the appropriate pressure to clean the DPF. The appropriate pressure, the duration of burst, the number of burst will vary depending on the size, type, condition, manufacturer and other factors of the DPF. The burst of air will dislodge particulates in the DPF and flow the particulate down an outlet tube (not shown within the bellows) that funnels the particulates into the collection tank 124.

As stated above, the collection tank includes at least one or more filters that filter the air containing the particulates. After the air is filtered, the air can then flow through a HEPA filter before being exhausted into the environment. Within the collection tank there are two pressure transducers 150. One transducer is placed within a location of the collection tank to indicate based on back pressure when the filters need to be changed or cleaned. The increase back pressure indicates that the filters are no longer filtering properly and that a reverse cleaning is needed. The reverse cleaning of the filters can occur by the reverse pulse valves 154 being opened by the controller. The flow of air through these valves will dislodge particulates trapped by the filters and then fall to the bottom of the collection tank where fluidizers help to condense the particulates for vacuuming by the vacuum 156. The bottom of the collection tank includes a hose 178 having ball valve 176 that is connected to the vacuum 156. The vacuum 156 can suck the particulates from the collection tank or from the filter housing and the particulate can collect in the collection container 158 that is coupled to the vacuum. An auxiliary hose can be provided in the filter housing 102 to collect any particulates that are trapped within the filter housing. The second pressure transducer in the collection tank measures the back flow pressure of the HEPA filter. This will indicate when the HEPA filter needs to be replaced. Another pressure transducer can be located near the vacuum in order to determine when the collection container needs to be replaced based on the pressure measurements.

The vacuum can operate in conjunction with the pulsing so as to keep the particulates within the filter housing and the system. The vacuum hose 170 is provided to suck up any particulate desired by the user. The hose 170 can also be positioned anywhere in the system 100 as needed by the user. The vacuum can also be turned on when there is no pulsing. The vacuum can also be toggled manually or automatically between operating when the pulsing is on to draw particulates out of the filter housing and draw the particulates when the particulates have been fluidized. The automation can be accomplished by the controller 160 being programmed by software that uses the various pressure sensors 150 to determine when to toggle.

The pressure transducers discussed herein can communicate with the controller 160. Based on previously programmed operating parameters, the controller can alert the user via the display or other means such as sound, LED or other indicators that the system 100 needs to be serviced or not working properly. Some of the service may include, for example, replacing the filters or reverse pulse the filters, replacing the HEPA filter, remove the particulates from the collection container and other servicing.

Figure 4:
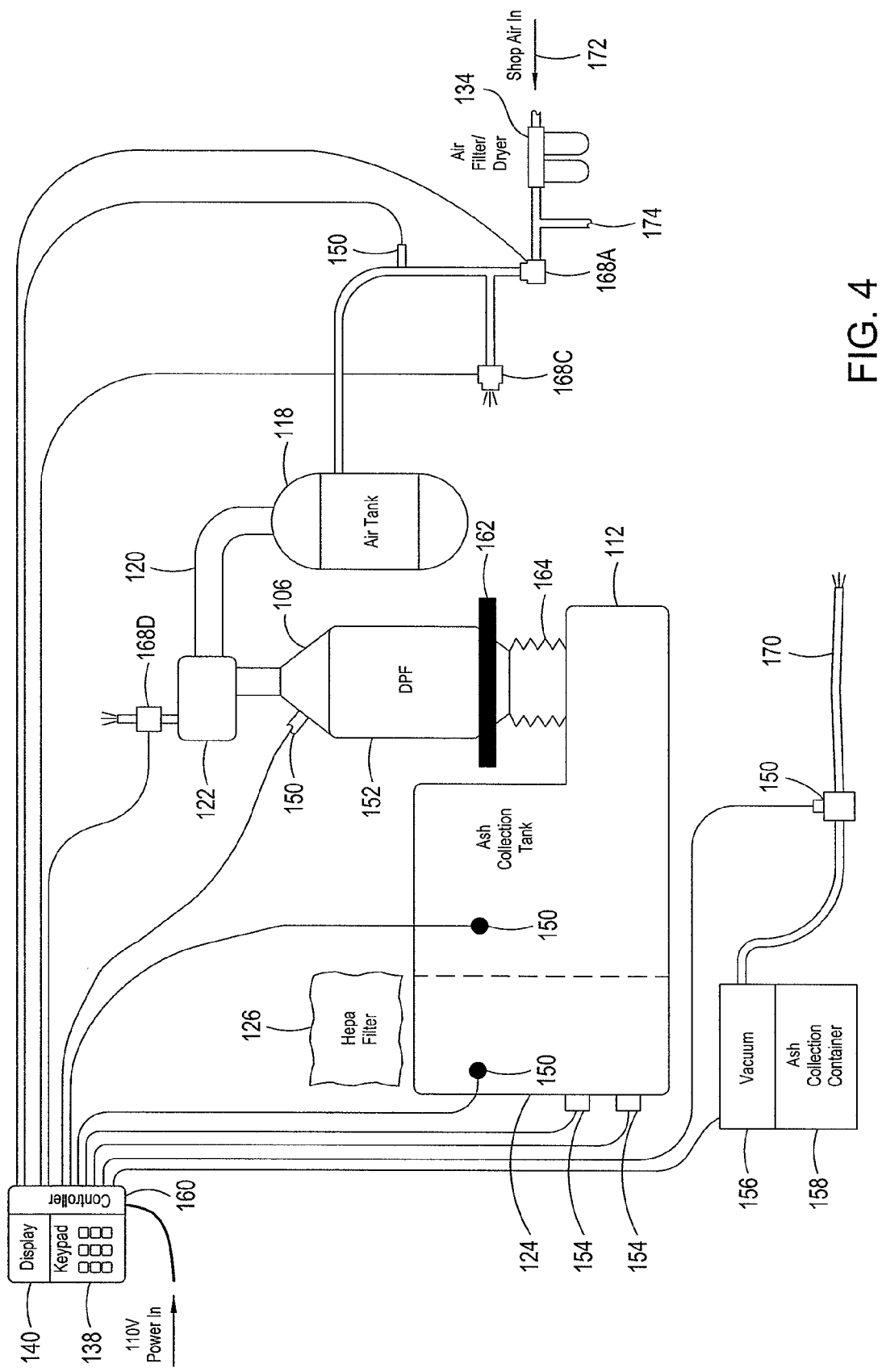
FIG. 4 illustrates another embodiment of the system of the invention.

FIG. 4 illustrates another embodiment of the system 100 of the invention. In this embodiment, the fluidizers 166 are removed from the ash collection tank 112. Additionally, the valve 168b, line 178 and valve 176 have also been removed due to the lack of fluidizers. The vacuum disclosed herein is capable of removing the ash without the need of the fluidizer.

Figure 5:
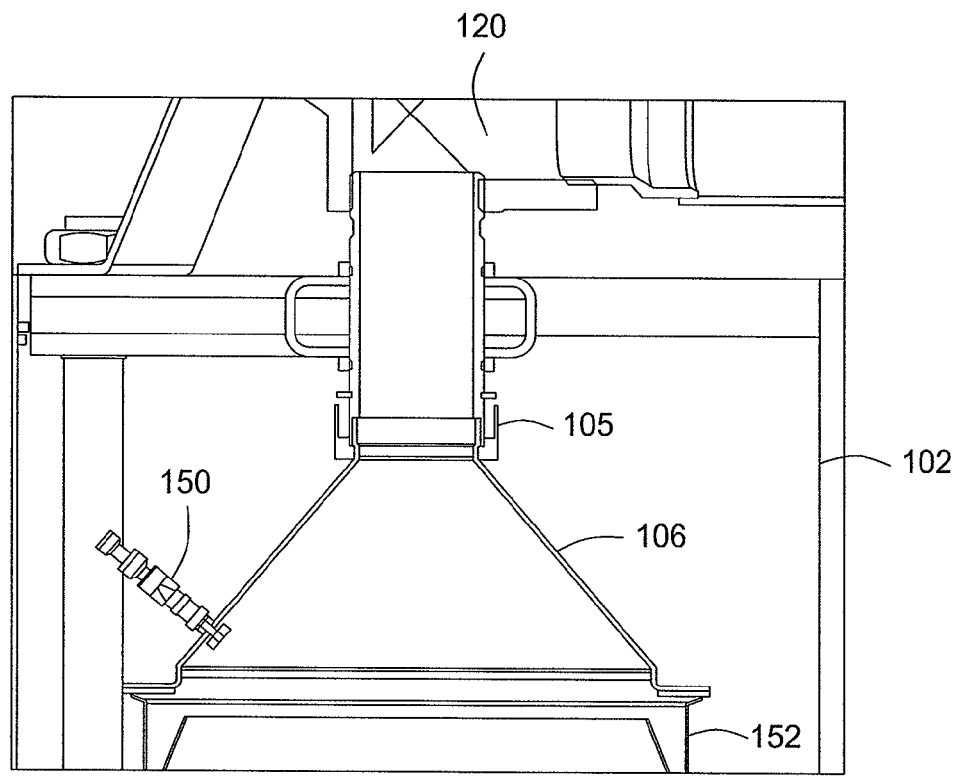
FIG. 5 illustrated the filter cone connection of the present invention.

FIG. 5 illustrated the filter cone 106 connection of the invention. The filter cone 106 can be any shaped other than cone shape, such as, cylindrical, tube, square or other shapes. The filter cone 106 is constructed and arranged to mate with the DPF 152. The filter cone 106 can have a sealable connection with the DPF so that air can be efficiently used to remove the particulates from the DPF. The filter cone 106 can be interchangeable so that the filter cone can fit various sizes of DPF. A quick coupler connection 105 allows the user to quickly replace the filter cone so that down time of the system 100 is minimized. The pressure transducer 150 in the cone measures the inlet air portion of the filter and another pressure transducer in the housing measure pressure of the burst of air at the outlet of the filter. The difference between these two pressures determined by the controller can help determine if the filter is being cleaned or is capable of being cleaned.

FIG. 6 illustrates the filter holder 180 of the present invention. The filter holder is constructed and designed to mate with a bottom portion of the DPF filter. The filter holder 180 can have co-centric rings with steps 184 of varying diameters or other shapes to mate with the DPF. Sealers 182 such as o-rings can also be used to form a seal with the DPF so that burst air does not leak out into the housing 102. In another embodiment, the sealers 182 can be rectangular rubber gaskets or other shaped gaskets. Sealers 182 can be any shape or type and made from any resilient material so that a seal can be made between the filter holder and the DPF.

Figure 7A:
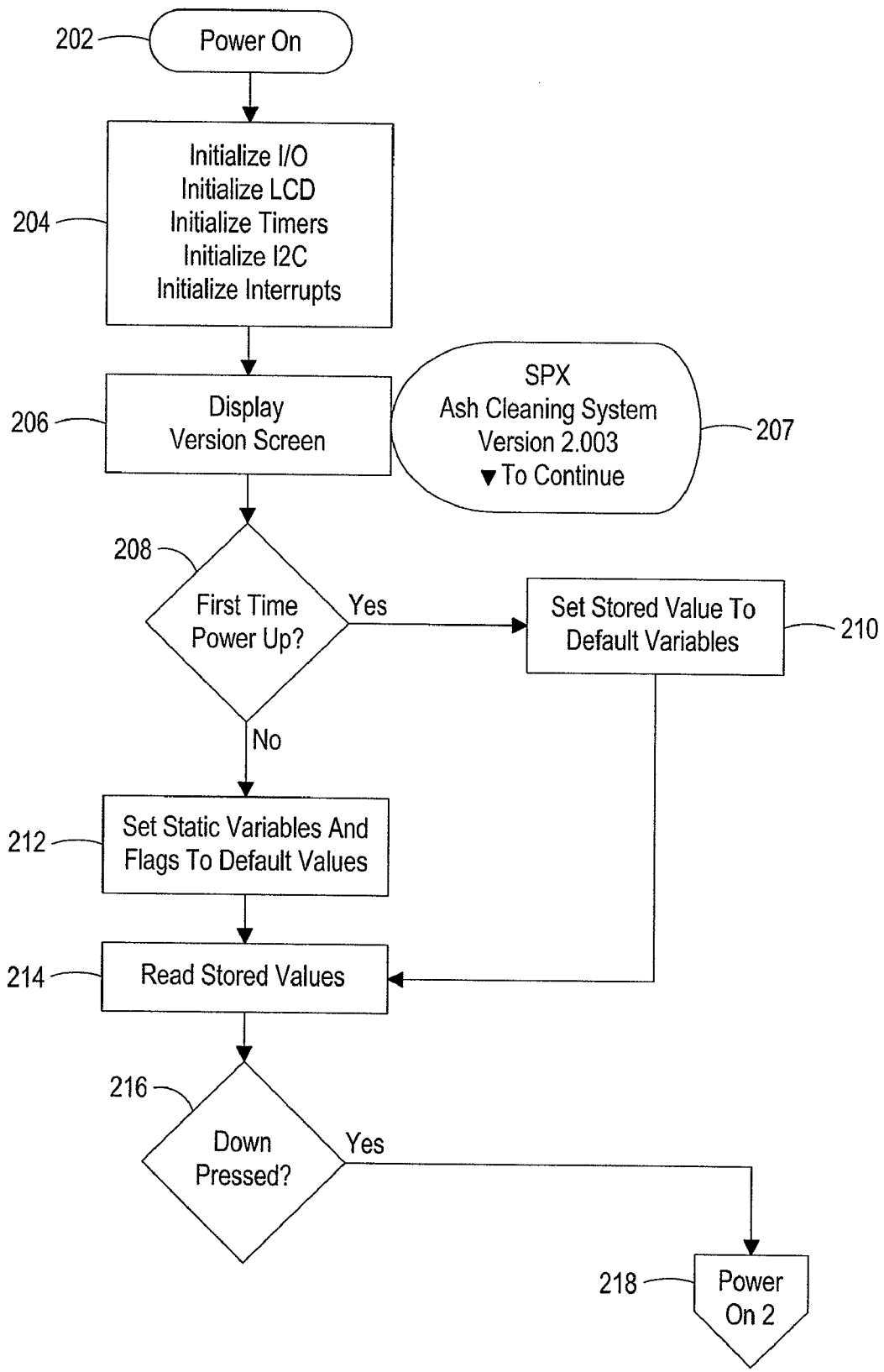

FIGS. 7A through 7M illustrate a method to operate the system 100 according to an embodiment of the present invention. The method step can be performed via software previously programmed and loaded into a processor or controller 160 located in the control panel. In other embodiments, some of the steps performed herein can be manually done. Turning to FIG. 7A, which illustrates the initial start of the system 100 according to an embodiment of the invention. The power button can be pressed and the system 100 is turned on at step 202 and the I/O, LCD, timers, I2C and interrupts are initialized at step 204. The LCD can display at step 206 a message 207 containing the current version of the software and other information. At step 208, the program determines if this is the first time the system has been powered up. If yes, at step 210, the program sets the stored values to default variables and proceeds to step 214. If no, at step 212, the program set static variables and flags to default values. At step 214, the program reads the stored values and at step 216, the program determines if a "DOWN" arrow on the control panel has been pressed. If yes, the program proceeds to step 218 (proceed to FIG. 6B). When a "DOWN" arrow is pressed, this typically means that the user wants to continue to the next step of the program.

Figure 7B:
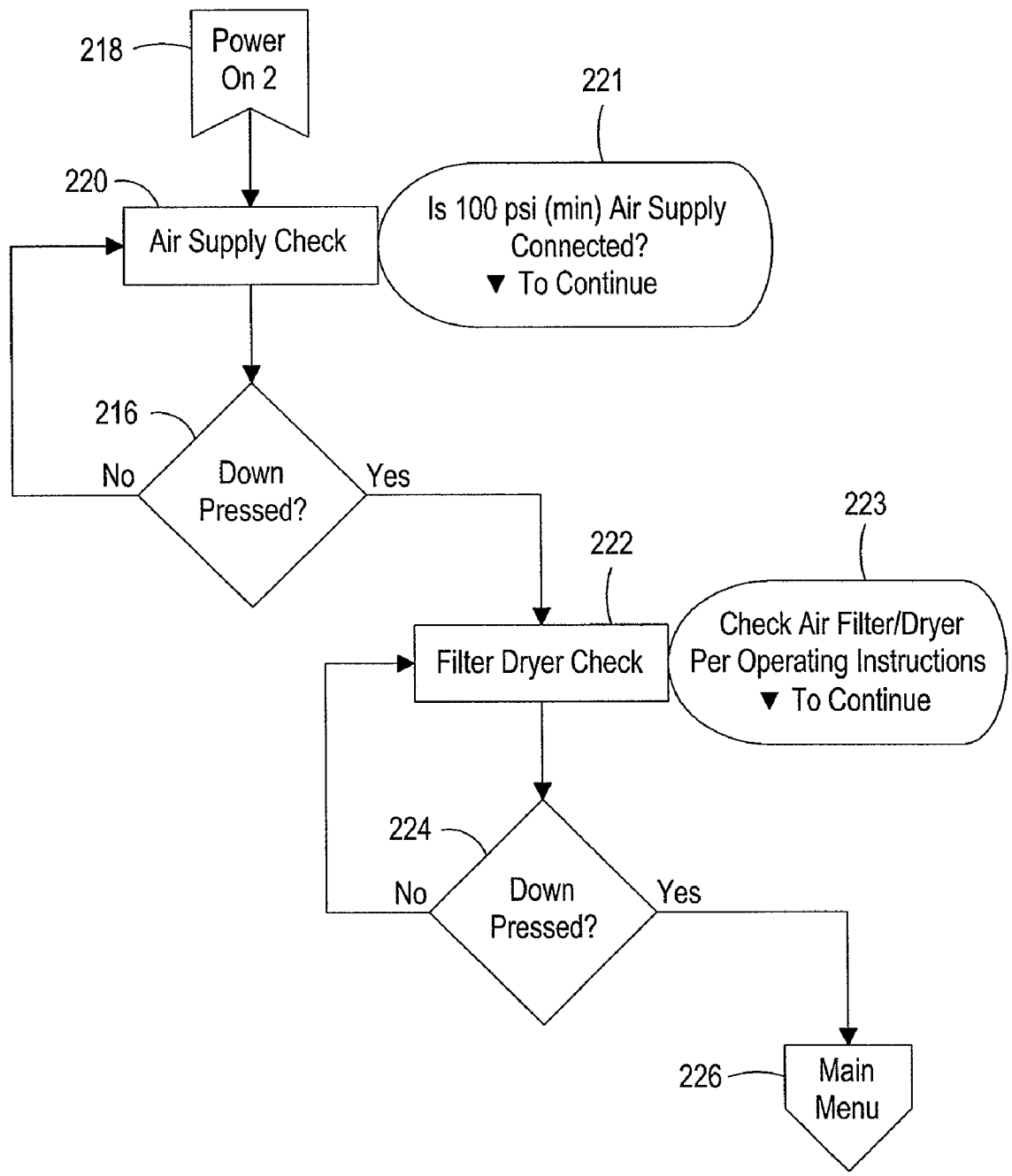

Turning to FIG. 7B which continues the power on steps of FIG. 7A, at step 218, the program proceeds to step 220 where the air supply is checked, and a message 221 instructs the user to confirm that an air supply is connected to the system is displayed. If the air supply is connected, the "DOWN" arrow is pressed to continue. At step 216, the program determines if the "DOWN" arrow was pressed. If the "DOWN" arrow was not pressed, then the program returns to step 220. If "DOWN" arrow was pressed then the program proceeds to filter dryer test at step 222. A message 223 is shown to instruct the user to check the filter/dryer per the operating instructions and press the "DOWN" arrow key to continue. At step 224, the program checks to see if the "DOWN" arrow was pressed and if no, then the software returns to step 222. If yes, then the software proceeds to step 226 and to the main menu portion of the program.

FIGS. 7C1 and 7C2 illustrate the main menu portion of the steps to operate the system 100. Step 226 from FIG. 7B proceeds to step 228 where the message 229 is displayed to request if the user would like to "START" the cleaning process. At step 230, the program determines if the "START" button was pressed. If yes, the program proceeds to step 232 where the operator can set the variables for the cleaning process. If no, the program proceeds to step 234 where the program determines if the "VAC" button was pressed on the control panel.

If the "VAC" button was pressed, the display displays message 235 to instruct the user to turn VAC valve to normal position and press "START" to start vacuuming or alternatively press the "DOWN" arrow to quit. At step 236, the program determines if the "START" button was pressed, if yes, then vacuum is started at step 237 and the display displays message 235 to instruct the user to press "STOP" to stop the vacuum or "DOWN" arrow to quit the program. The program proceeds back to step 236. If at step 236, the "START" was not pressed, then the program determines if the "STOP" button was pressed at step 239. If yes, then the vacuum is turned off at step 240 and the display displays message 241 to instruct the user to turn the VAC valve to Normal position and to press "START" to start the vacuum or press the "DOWN" button to quit. The program then proceeds back to step 236. If no, at step 239, the program proceeds to step 242 to determine if the "DOWN" button was pressed. If yes, then vacuum is turned off and the program returns to step 228, which displays message 229. If no, then the program returns to display message 235.

Returning to step 234, if the VAC button was not pressed, then the program proceeds to step 244 and determines if the "UP" button was pressed. If no, then the program proceeds to step 228. If yes, then the display displays message 245 to instruct the user to enter memory key write. At step 246, the program determines if the memory key write is complete. If no, then the program proceeds back to message 245. If yes, then the program proceeds to step 247 to determine if the memory key write was a success or not. If success, then message 248 indicating the memory key write success to the user, if not successful, then message 250 indicates that the memory key write failed. After the messages 248 or 250 is displayed, then the program proceeds to step 249 to determine if any key is pressed. If yes, then the program proceeds to message 229, if no, then the program loops until a key is pressed.

FIGS. 7D1 and 7D2 illustrate the steps of operator selecting variables according to an embodiment of the invention. The program is at step 232 and proceeds to step 252 for manual variable selection for DPF cleaning, and displays message 253 to instruct the user to manual select the variables for cleaning and press "ENTER" to continue or the "DOWN" arrow key for tank evacuation. At step 254, the program determines if the "ENTER" key has been pressed. If yes, then program proceeds to step 259 where message 260 instructs the user to enter the clamping force and then press "ENTER" to continue. At step 261, the program determines if "ENTER" has been pressed and if yes, proceeds to step 262 where it determines if it was an acceptable value. If value is acceptable then message 263 instructs user to enter the burst pressure and press "ENTER." If yes, then the program proceeds to step 265 to determine if the value entered was acceptable. If yes or acceptable value, then program proceeds to step 266. If no, then the program proceeds back to message 263. If at step 264, the program determines that "ENTER was not pressed, then it returns to step 263

Returning to step 254 if the "ENTER" button was not pressed, the program proceeds to step 255 where it determines if "STOP" button was pressed. If yes, the program RETURNS to the beginning or at a predetermined position in the program. If no, then the program determines at step 257 if the "DOWN" arrow has been pressed. If yes, then the program starts the Tank evacuation process at step 258. If no, then the program returns to step 254.

Figure 7E:
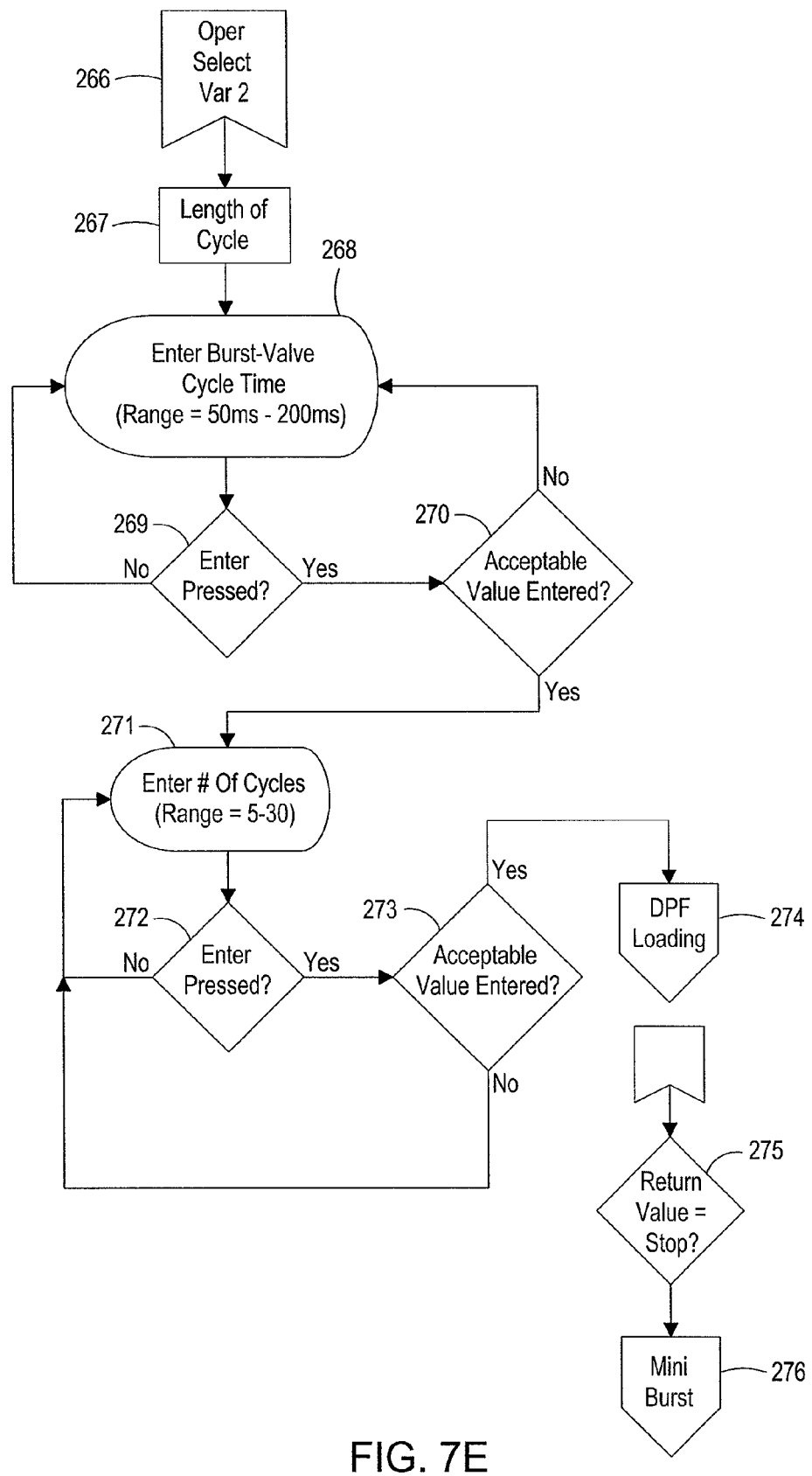

Turning to FIG. 7E, which illustrates the steps of entering operating variables according to an embodiment of the invention. At step 266 from FIG. 7D, the program proceeds to step 267 to determine the length of the cycle and message 268 is displayed to instruct the user to enter the burst cycle time and press the "ENTER" button to continue. At step 269, the program determines if the "ENTER" button was pressed, and if yes, then the program determines if it is an acceptable time at step 270. If "ENTER" is not pressed, then the program loops back to show message 268. If the time is not acceptable, then the program loops back to message 268. If the time entered is acceptable, then message 271 instructs the user to enter the number of cycles and press "ENTER" and then proceeds to step 272 to determine if "ENTER" was pressed. If no, then message 271 is displayed, if yes, then the program proceeds to step 273 to determine if the value is acceptable. If no, then the program displays message 271, if yes, the program proceeds to step 274 for DPF loading portion of the program, to determine if the "STOP" button was pressed at step 275 and mini burst 276 portion of the program.

FIGS. 7F1 and 7F2 illustrate DPF loading steps into the system 100 according to an embodiment of the invention. Message 280 instructs the user to load the DPF and the appropriate adapters and press "V" to continue or "STOP" button to stop. At step 281, the program determines if "STOP" has been pressed. If yes, then the program proceeds to step 282 and then 283 to eventually stop the program. If no, then the program proceeds to step 284 and determines if the door on the enclosure 102 is open. If yes, the program will keep looping until the door is closed, if no, then the message 285 displays the clamping force that was previously entered. At step 286, the program determines if the clamping force is greater than or equal to target. If no, then red (indicates a problem) LED on the control panel is turned on the green (system OK) LED is turned off and the program returns to displaying message 285. If yes, then the red LED is turned off and the green LED is turned on. Message 289 displaying the clamp pressure and instructing the user to press "START" to beginning cleaning or "STOP" to stop the cleaning process. The program proceeds to step 290, where the program determines if "STOP" button has been pressed. If yes, the program proceeds to step 291 for RETURN and then proceeds to step 283. If no, then the program determines if the "START" button has been pressed at step 292. If no, then the program displays message 289. If yes, then the program proceeds to step 293 and then step 283.

FIGS. 7G1, 7G2 and 7G3 illustrate the mini-burst according to an embodiment of the invention. As stated above, the mini-burst can make sure that the DPF is not too clogged for cleaning. Message 302 indicates to the user that cleaning is in process and to press "STOP" in order to perform an emergency stop on the system. At step 303, the program determines if the "STOP" button is pressed. If yes, the program stops and RETURN to the beginning or to a predetermined location in the program at step 304. As stated herein, when the programs RETURN, then it can go back to the beginning or to a predetermined location in the program. If no, then blue LED is turned on at step 305 and the program at step 306 determines if the tank pressure is greater than or equal to the burst pressure. If no, the controller opens solenoid valve C and delays 2 seconds and closes solenoid valve A. If yes, then controller closes solenoid valve C and opens solenoid valve A. After steps 307 or 308 are performed, the program proceeds to step 309 where a message indicates that the cleaning is in process and charge tank pressure is displayed. At step 310 the program determines if "STOP" has been pressed. If yes, then RETURN at step 311, if no, then the program proceeds to step 312 to determine if the clamp force and the door is OK. If no, the program will loop. If yes, then the program proceeds to step 313 to determine charge tank pressure is adequate. If no, then the program proceeds to step 314 where the program determines if a certain time has passed. If no, then the program returns to step 312, if yes, then message 315 is displayed to indicate tank fill has failed and the program is stopped.

If yes at step 313, then the controller opens solenoid valve A, closes valve C and starts Vacuum cleaner at step 316. Then message 317 is displayed to indicate vacuum filter check and to press "STOP" for emergency stop, then the program proceeds to step 318 to determine if "STOP" has been pressed. If yes, then vacuum cleaner is stopped at step 319 and then "RETURN" at step 320. If no, then program proceeds to step 321 to determine if a predetermined time has passed. If no, message 317 is displayed. If yes, then vacuum check at step 322 and do second mini-burst at step 323. Then the program proceeds to step 324 to determine if "RETURN" has been pressed. If yes, then "RETURN" at step 326, if no, then at step 325 the program determines if "REPEAT" has been pressed. If no, then "RETURN" at step 326, if yes, then the program proceeds to step 323 for repeat of mini-burst.

Figure 7H:
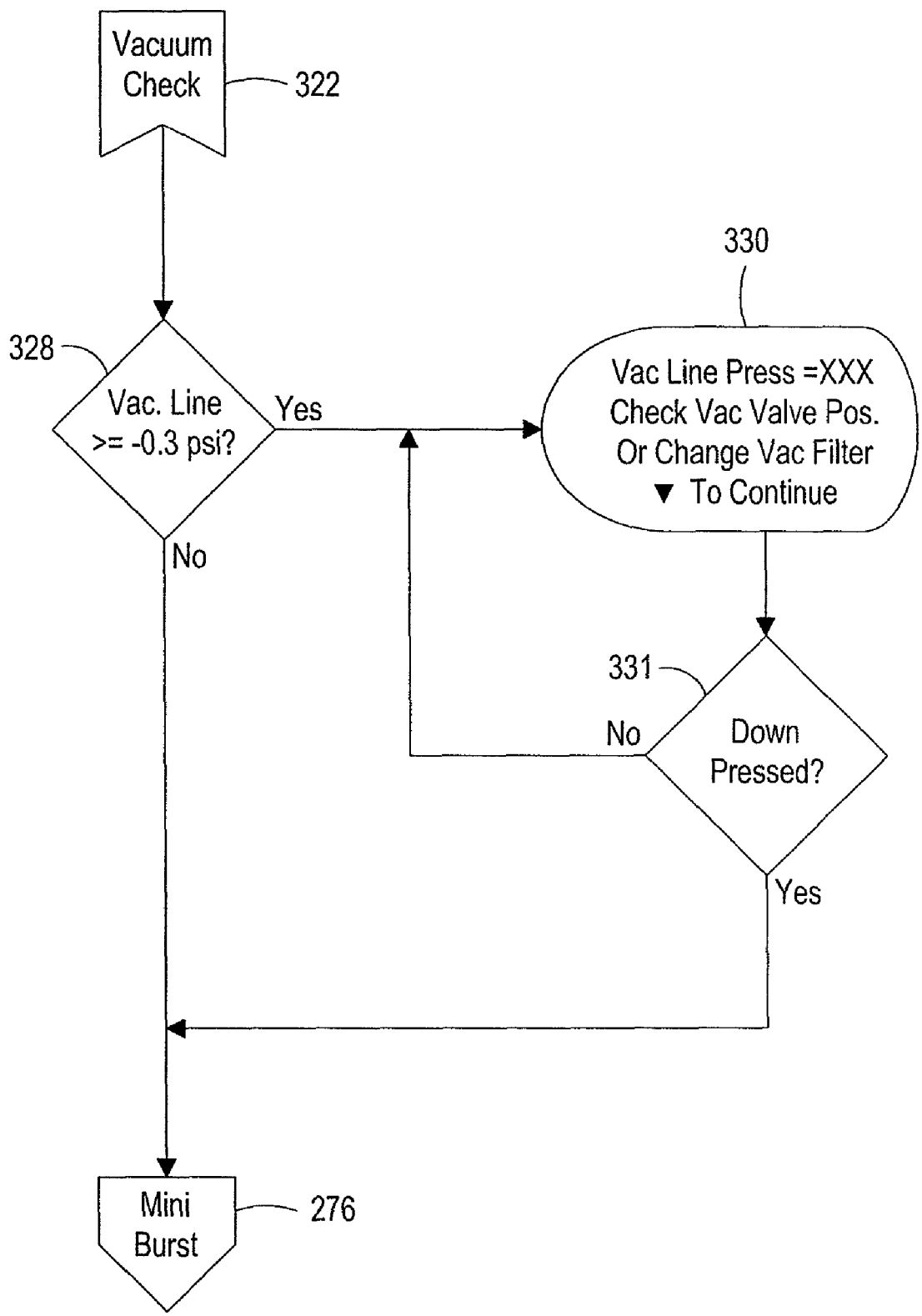

FIG. 7H illustrates the vacuum check according to an embodiment of the invention. From step 322 the program proceeds to step 328 where the program determines if the VAC line is OK. If no, then program proceeds to step 276 for a mini-burst as shown, for example in FIG. 7G. If yes, then message indicates the VAC line pressure and instruct the user to check VAC valve position or change VAC filter and press "DOWN" arrow to continue. At step 331, the program determines if the "DOWN" arrow has been pressed, if yes, then the program proceeds to step 276, and if no, then message 330 is displayed.

FIGS. 7I1 and 7I2 illustrate the mini-burst 2 according to an embodiment of the invention. The program starts at step 323 and proceeds to step 334 where the program resets the maximum cone and collection tank pressures to zero. At step 335, the controller opens solenoid valve B and proceeds to step 336, where the program determines if time is greater than or equal to cycle time. If no, then the program loops, if yes, then the controller closes valve B. At step 338, the program measures and stores the inlet cone and collection tank pressures. At step 339, the program determines if the inlet cone pressure is greater than or equal to the burst pressure. If no, then at step 341, the program measures and stores inlet cone and collection tank pressures and displays message 342, which states cleaning in process and the inlet cone pressure and proceeds to step 343. If yes, then red LED is turned on and message 344 is displayed and states the inlet cone pressure and to press the "DOWN" arrow to continue. At step 345, the program determines if the "DOWN" arrow has been pressed. If no, then message 344 is displayed, if yes, message 346 is displayed, which states filter is plugged, see manual for instructions and press the "DOWN" arrow to continue. At step 347, the program determines if the "DOWN" arrow has been pressed. If no, then message 346 is displayed, if yes, message 348 is displayed, which states press "DOWN" for another mini-burst or "STOP" to stop the process. At step 349, the program determines if the "DOWN" arrow has been pressed. If yes, then the program proceeds to step 350 and onto the mini-burst portion of the program. If no, then at step 351, the program determines if "STOP" has been pressed. If yes, then program returns to the main menu. If no, then the program returns to step 340.

FIGS. 7J1 and 7J2 illustrate the primary cleaning cycle according to an embodiment of the present invention. At step 360, the program determines if the door is closed. If no, then message 361 is displayed to instruct the user to close the door. If yes, then the program proceeds to step 362 and 363 where the program determines if the tank pressure is greater than or equal to the burst pressure. If no, then the controller opens valve C, delays 2 seconds and closes valve A at step 366 and if yes, the controller closes valve C and opens valve A at step 365. Both steps 365 and 366 proceed to step 367 where the controller opens valve A (if not opened). Message 368 is displayed showing that cleaning is in process and the various measured pressures. At step 369, the controller charges the tank pressure to be relatively equal to the burst pressure and if about 300 seconds have elapsed. If no, then message 368 is again displayed, if yes, then message 371 is displayed showing that tank fill process has failed due to the tank pressure not being equal to the burst pressure by the predetermined period of time. At step 372, the program resets inlet cone and collection tank pressures to zero and the controller opens solenoid valve B at step 373. At step 374, the program determines if the time is greater than the cycle time and if no, the program loops, and if yes, the program proceeds to step 375. At step 375, the program determines if this is the last cycle. If yes, then close valve B at step 376 and proceed to step 377 and if no, then proceed to step 377. At step 377, the program measures and stores the inlet cone and collection tank pressures and proceeds to 379 for an increment count. At step 380, the program determines if the repeat count is greater than or equal to the number of cycles. If no, then return to step 367 (to clean again) and if yes, then closes valve A and C at step 381 and pulses valve B to empty charge tank at step 382. At step 383, the program determines if a predetermined delay time has passed. If yes, then close valve B at step 385, increment filter count and save at step 386 and remove DPF at step 387 and the program returns to main menu at step 388. If no, then the program determines if "STOP" has button been pressed. If yes, then return to main menu at step 388 and if no, then return to step 383.

Figure 7K:
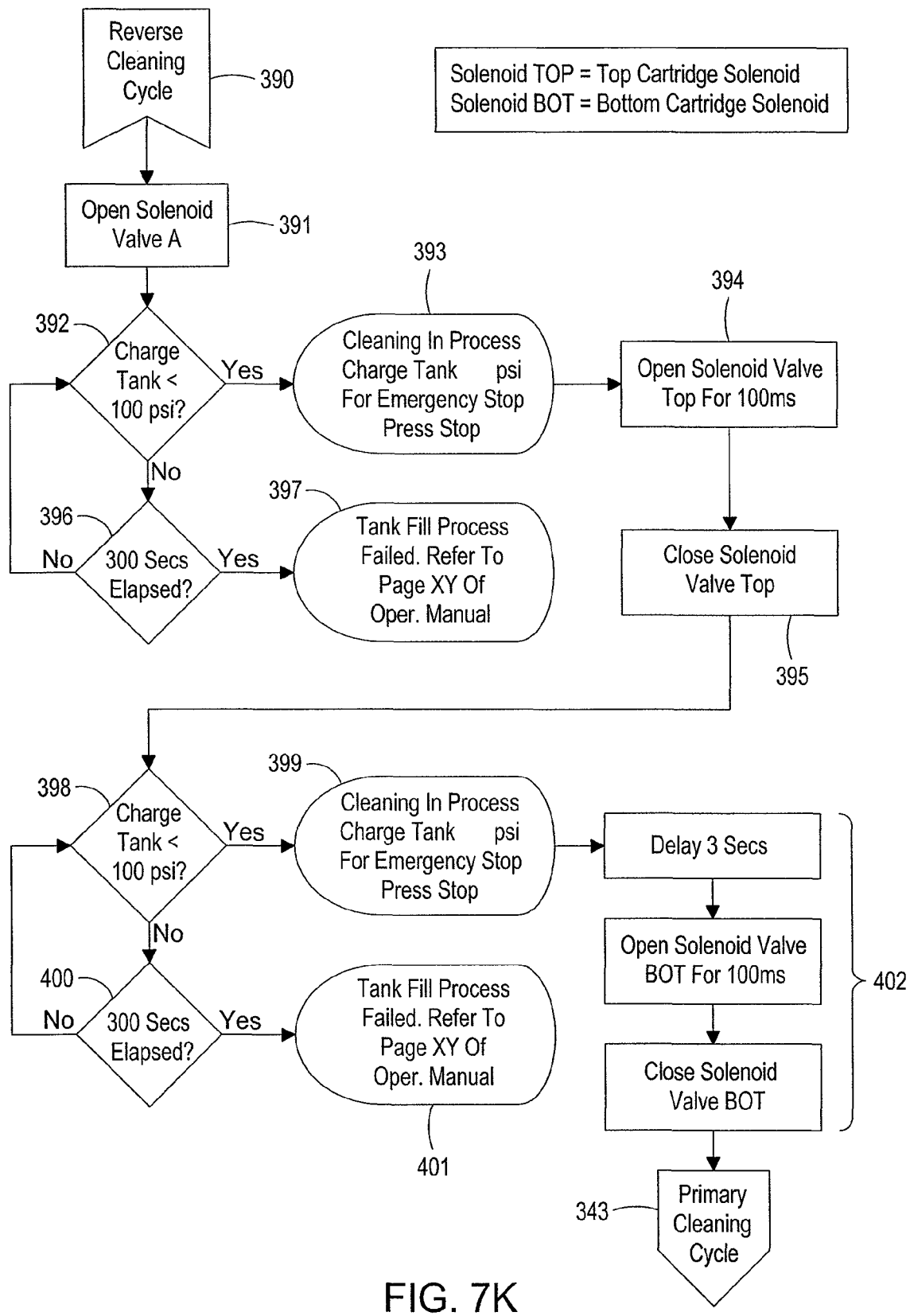

FIG. 7K illustrates the reverse cleaning process according to an embodiment of the invention. At step 390, the reverse cleaning process begins and proceeds to step 391, where the controller opens valve A. At step 392, the program determines charge tank is less than a predetermined pressure. If no, then proceed to step 396. If yes, then message 393 is displayed to show that cleaning in process and press "STOP" for emergency stop. At step 396, if a predetermined time has passed, then message 397 is displayed showing that tank fill has failed, and if no then return to step 392. At step 394, the controller opens the TOP solenoid valve (154) for a predetermined period of time and at step 395 closes the valve TOP. At step 398, the program determines if charge tank is less than a predetermined pressure, and if yes displays message that cleaning in process and press "STOP" for emergency stop. If no, then has a predetermined time has passed. If no, then return to step 398 and if yes display message 401 to show that tank fill has failed. At step 402, a time delay is done by the program and the controller opens the BOTTOM solenoid for a period of time and then closes it at step 402. Then the program proceeds back to step 343.

Figure 7L:
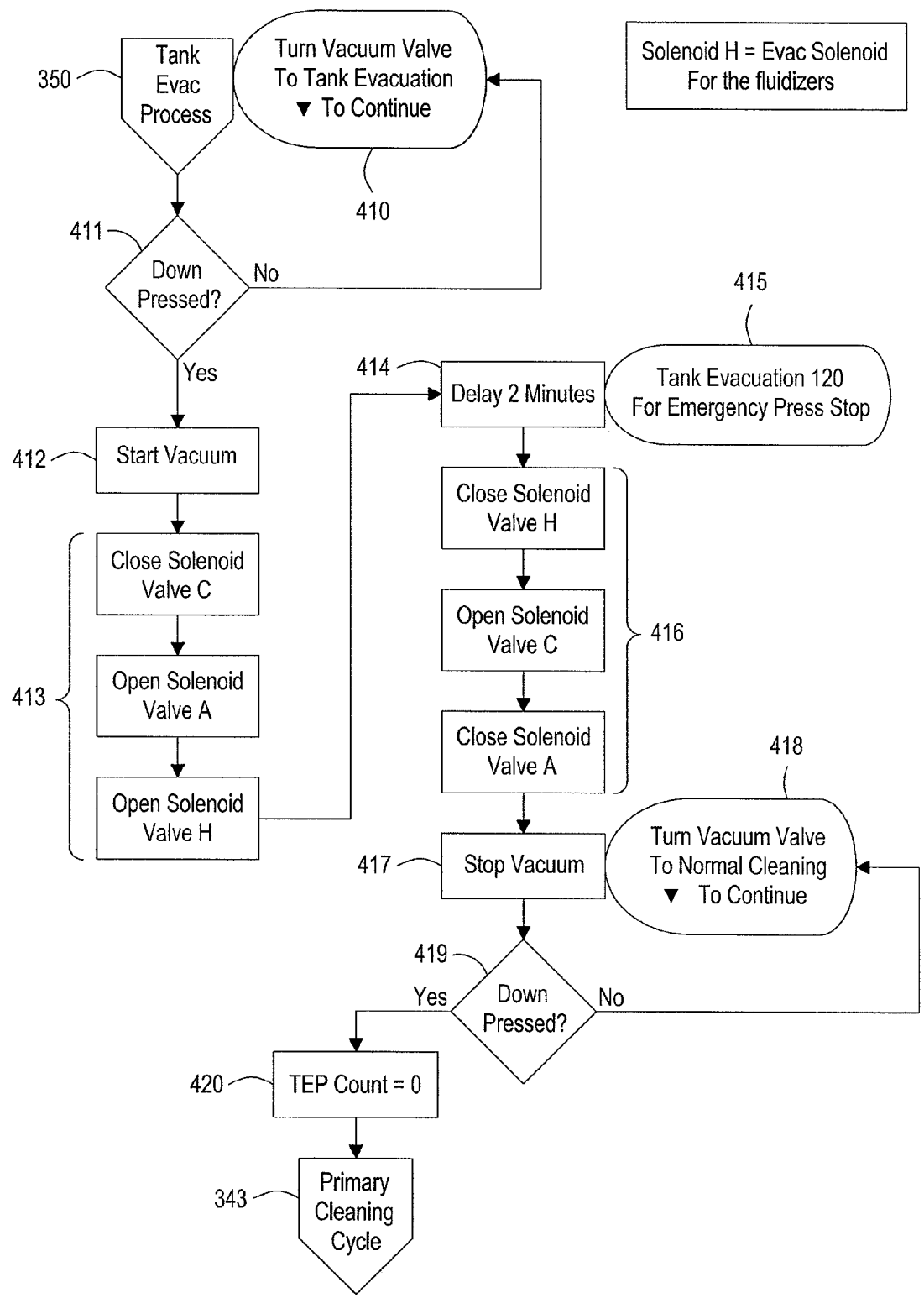

FIG. 7L illustrates a tank evacuation process according to an embodiment of the present invention. The process starts at step 350 and message 410 instructs the user to turn the vacuum valve to tank evacuation and press the "DOWN" arrow to continue. At step 411, the program determines if "DOWN" arrow has been pressed. If no, then program returns to message 410 and if yes, at step 412, the vacuum is started. At step 413, the controller closes valve C, opens valve A and opens valve H at step 413. At step 414, a predetermined time delay is performed and message 415 shows tank evacuation in progress and press "STOP" for emergency stop. At step 416, the controller closes valve H, opens valve C and closes valve A. At step 417, the vacuum is stopped and message 418 instructs the user to turn vacuum valve to normal cleaning and press "DOWN" arrow to continue. At step 419, the program determines if the "STOP" arrow has been pressed and if no, then message 418 is displayed. If yes, then at step 420 the TEP count is determined and the program returns to step 343.

Figure 7M:
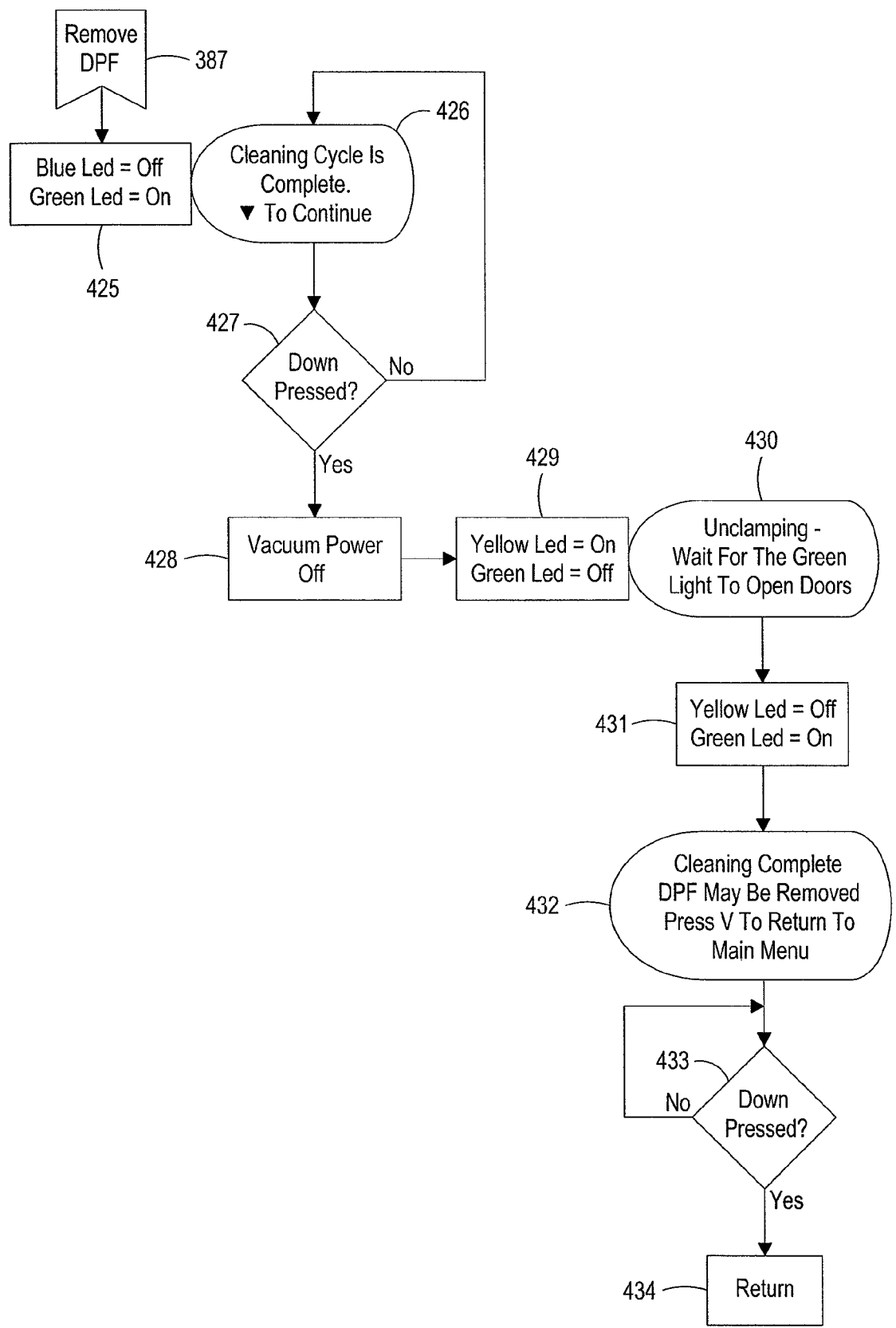

FIG. 7M illustrates the steps to remove the DPF from the system 100 according to an embodiment of the invention. The steps starts at step 387 and proceeds to step 425 where the blue LED is OFF and the green LED is on and the message 426 shows that the cleaning cycle is completed and for the user to press the "DOWN" arrow to continue. At step 427, the program determines if the "DOWN" arrow has been pressed. If no, then message 426 is displayed and if yes then the vacuum power is turned off at step 428. At step 429, the yellow LED is on and the green LED is off. Message 430 instructs the user to unclamp but wait for the green LED to open the doors. At step 431, the yellow LED is off and green LED is on. Message 432 shows that the cleaning is complete and the DPF may be removed and the user can press "V" to return to the main menu. At step 433, the program determines if the "DOWN" arrow has been pressed. If no, then program loops and if yes, then RETURN at step 434.

The cleaning operation of system 100 can be automated via software and controllers as much as possible and the steps can be performed in any order by the software in conjunction with the controller. The user can scan any code located on the DPF or manually input the information, such as make, model, manufacturer via the input keys. The user can also enter information such as operating variables, such as burst time, pressure, number of burst, clamping force desired and other operating parameters. The user can place the DPF on the table in the filter housing and the doors can be shut manually or automatically. The table can lift (manually or automatically) the DPF to the filter cone to seal the cone and the DPF. The table can be adjusted so that the desired clamping pressure is created with the assistant of the pressure transducer. A mini burst can be used to test the DPF to see if it can withstand a burst of air. This can also be monitored by a pressure transducer. The burst can be created and the vacuum can also be used to keep the particulates within the system. The vacuum can continue to remove any residual particulates from the filter housing or from the collection tank.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A particulate removal tool that cleans a diesel particulate filter, comprising:
   a control panel having a controller to control the particulate removal tool functions, wherein the control panel includes an input device;
   an air tank that supplies air for a burst of air to clean the diesel particulate filter to be cleaned;
   a filter cone adapted to mate with the diesel particulate filter to be cleaned and to receive the air from the air tank;
   a quick acting valve controlled by the controller and configured to provide the burst of air to clean the diesel particulate filter to be cleaned, wherein the air used by the quick acting valve is supplied by the air tank;
   a filter holder configured to hold the diesel particulate filter to be cleaned in place on a movable table;
   a hydraulic pump to move the movable table;
   a collection container having a first filter to filter a particulate filled air resulting from the cleaning of the diesel particulate filter to be cleaned; and
   a vacuum to remove particulate from the tool, wherein a filter housing is configured to house the diesel particulate filter to be cleaned, the filter cone, the filter holder, and the movable table.

2. The tool of claim 1 further comprising:
   a display connected with the controller to display information to a user;
   a bellow coupled to the movable table and configured to contain particulates loosened during the cleaning of the diesel particulate filter;
   a pressure transducer configured to measure a pressure in the tool and controlled by the controller; and
   a quick disconnect that releases the filter cone from the tool.

3. The tool of claim 2, wherein a clamping pressure is created between the cone and the filter in part by the movable table and the pressure transducer determines the clamping pressure, the pressure in the collection container and conveys a reading to the controller.

4. The tool of claim 2 further comprising of reverse flow valves to reverse the flow of air through the first filter in the collection container to clean the first filter, wherein the air to the reverse flow valves is provided by an external air source and the controller controls the activation of the reverse flow valves based on the reading of the pressure transducer.

5. The tool of claim 1 further comprising:
   an external air source that supplies air to the air tank;
   solenoid valves to direct the air from the external air source to the air tank, and to reverse flow valves that reverse a flow of air through the first filter in the collection container to clean the first filter; and
   a second filter and a dryer to clean and dry the air from the external air source before the air enters the air tank.

6. The tool of claim 1, wherein the filter holder includes steps configured to receive various sizes of diesel particulate filter to be cleaned and sealing members that mate with the diesel particulate filter.

7. The tool of claim 1 further comprising:
   a HEPA filter configured to filter the air before it is released to the surrounding environment;
   an LED positioned on a surface of the control panel and communicates with the controller;
   a door sensor to detect when a door of the filter is open; and
   a window provided on the filter housing to allow a user to see the cleaning operation.

8. The tool of claim 3, wherein the clamping pressure ranges from about 500 to 2000 p.s.i.

9. A particulate removal tool that cleans a diesel particulate filter, comprising:
   a means for controlling having a means for processing configured to control the particulate removal tool functions, wherein the means for controlling includes a means for inputting;
   a means for supplying air configured to supply air for a burst of air to clean the diesel particulate filter to be cleaned;
   a means for adapting configured to adapt to mate with the diesel particulate filter to be cleaned and to receive the air from the means for supplying air;
   a means for pulsating air controlled by the means for processing and configured to provide the burst of air to clean the diesel particulate filter;
   a means for holding configured to hold the diesel particulate filter to be cleaned in place on a means for supporting;
   a means for moving configured to move the means for supporting, wherein a clamping pressure is created between the means for adapting and the filter in part by the means for supporting;
   a means for collecting having a first filter to filter particulate filled air resulting from the cleaning of the diesel particulate filter to be cleaned; and
   a means for vacuuming configured to remove particulate from the tool, wherein a means for housing is configured to house the diesel particulate filter to be cleaned, the means for adapting, the means for holding, and the means for supporting.

10. The tool of claim 9 further comprising:
a means for displaying connected with the means for processing to display information to a user;
a bellow coupled to the means for supporting and configured to contain particulates loosened during the cleaning of the diesel particulate filter;
a means for sensing pressure configured to measure a pressure in the tool and controlled by the means for processing; and
a means for disconnecting that releases the means for adapting from the tool.

11. The tool of claim 10, wherein the means for sensing pressure determines the clamping pressure, the pressure in the means for containing and conveys a reading to the means for processing.

12. The tool of claim 10 further comprising of means for reversing air flow configured to reverse the flow of air through the first filter in the means for collecting to clean the first filter, wherein the air to the means for reversing is provided by an external air source and the means for processing controls the activation of the means for reversing based on the reading of means for sensing pressure.

13. The tool of claim 9, wherein the means for adapting includes steps configured to receive various sizes of diesel particulate filter to be cleaned and sealing members that mate with the diesel particulate filter.

14. The tool of claim 9 further comprising:
a HEPA filter configured to filter the air before it is released to the surrounding environment;
an LED positioned on a surface of the control panel and communicates with the controller;
a door sensor to detect when a door of the filter is open; and
a window provided on the filter housing to allow a user to see the cleaning operation.

15. The tool of claim 9, wherein the clamping pressure ranges from about 500 to 2000 p.s.i.

* * * * *